March 27, 1962     J. M. BLANK     3,027,327
PREPARATION OF FERROMAGNETIC FERRITE MATERIALS
Filed Oct. 8, 1957     8 Sheets-Sheet 5

INVENTOR:
JOHN M. BLANK,
BY Charles W. Helzer
HIS ATTORNEY.

March 27, 1962  J. M. BLANK  3,027,327
PREPARATION OF FERROMAGNETIC FERRITE MATERIALS
Filed Oct. 8, 1957

SOME EQUILIBRIUM AND OFF-EQUILIBRIUM ATMOSPHERE LINES USED FOR PREPARATION OF COMPOSITION NO. 705

SCHEMATIC HYSTERESIS LOOP FOR DEFINING SQUARENESS RATIO R.

INVENTOR:
JOHN M. BLANK,
BY Charles W. Hefner
HIS ATTORNEY.

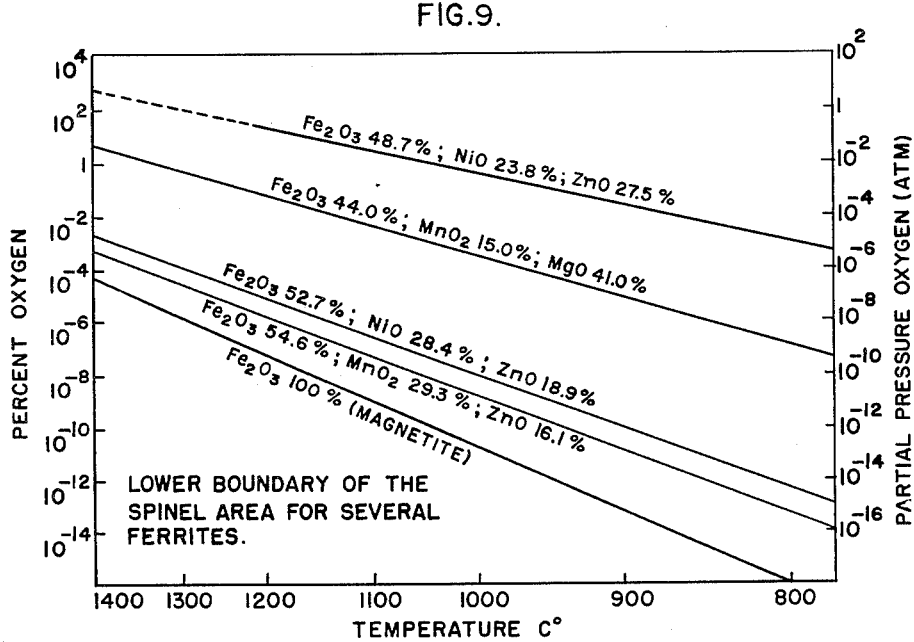
FIG. 9. Lower boundary of the spinel area for several ferrites.
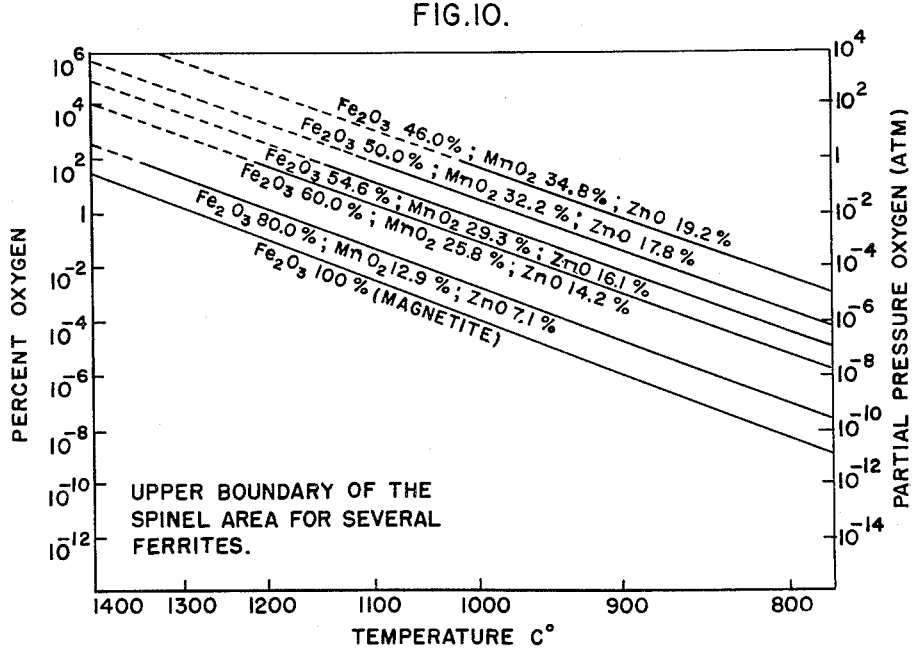
FIG. 10. Upper boundary of the spinel area for several ferrites.
INVENTOR:
JOHN M. BLANK,
BY HIS ATTORNEY.

3,027,327
PREPARATION OF FERROMAGNETIC FERRITE MATERIALS
John M. Blank, Pennellville, N.Y., assignor to General Electric Company, a corporation of New York
Filed Oct. 8, 1957, Ser. No. 688,850
13 Claims. (Cl. 252—62.5)

The present invention relates to non-metallic ferromagnetic materials known as ferrites.

More specifically the invention relates to a new and improved method of manufacturing ferrites whereby the magnetic properties of such materials can be readily controlled and improved.

Ferrites are ceramic-like materials which have high magnetic permeabilities and also high volume resistivities which distinguish them from magnetic metals which have high magnetic permeabilities but very low volume resistivites in that the known magnetic metals are good electrical conductors. Because of these characteristics ferrites are ideally suited for use as cores in deflection coils and fly-back transformers for television receiving sets, tuning slugs, filter elements, antenna cores, and a number of other practical applications where the high volume resistivity of ferrites prevents the development of undesired large eddy currents at higher alternating current frequencies. Additionally, ferrites have other unique properties at high radio frequencies (microwave region) which make them peculiarly adaptable for use in constructing components of systems operating at such higher radio frequencies.

A synthetic two or more cation species ferrite has been defined as a single phase homogeneous crystalline material which is a compound of the reaction product of at least one metal (different than iron) oxide and iron oxide and has the empirical formula $MFe_2O_4$ where M represents a bivalent metal other than iron. If the bivalent atoms which replace M in the above formula are about the same diameter as the iron atoms, a synthetic ferrite having two or more cation species is formed which has the same basic spinel type crystal structure characteristic of the single cation species ferrous ferrite found in nature known as magnetite ($Fe_3O_4$).

As stated above, magnetite is naturally occurring, and was known among the early Greeks before the Christian era. Hilpert was one of the early experimenters who first worked on synthetic two or more cation specie ferrites, and took out patents on such ferrites in 1909 (see German Patents 226,347 and 227,787 both issued in 1909). A number of Japanese investigators were also active in the preparation of synthetic two or more cation specie ferrites in the early 1930's as evidenced by U.S. Patents 1,976,230 and 1,997,193. In 1940 J. L. Snoek of Holland and his associates undertook extensive investigations into the nature of such ferrites, and their methods of manufacture. Some of the results of this investigation were reported by Snoek in his book entitled, "New Developments in Ferromagnetic Materials" Elsevier Publishing Company, New York, New York; 1947.

Conventional ceramic processing methods are used to convert metal oxide raw materials to ferrites having desired magnetic characteristics. The procedure has been to start with oxide raw materials which are substantially pure, and have as fine a particle size as are commercially obtainable. These oxide raw materials are then mixed with a mixing medium, usually water, and milled in a steel ball mill. Although the ball mill is commonly used, other mixing devices such as coloid mills and attritors may be used. After milling the homogeneous oxide mixture is oven dried, and the resulting cake after pulverization may be pre-sintered, which consists of heat treating the oxide mixture at a temperature somewhat lower than the final firing temperature. All or part of the oxide mixture may be presintered for it has been shown that the presintering is helpful in controlling shrinkage in the final shape, and influences grain parameters, size and shape, and influences grain parameters, size and shape of pores appearing in the resulting ferrite, and homogeneity; however, the presintering step may be completely eliminated in certain manufacturing processes. After presintering, or if no presintering is used, after drying, the oxide mixture is comminuted to a particle size that is ceramically workable, and organic binders are usually added to serve as a binder and particle lubricant. Conventional means such as die pressing and extruding are then used to press the oxide mixture into desired shapes. The shaped metal oxide raw materials are then fired to a sintering temperature in a suitable furnace.

It has been suggested by a number of authors that to procure the most desirable magnetic properties in a ferrite, the selection of the firing schedule for the ferrite is preceded in importance only by the selection of its composition. This statement is based on the established fact that the firing schedule of the ferrite can influence its chemical composition (oxygen content); phase relation; amount, size and shape of pores; grain parameters; and strains, all of which characteristics affect the magnetic properties of the ferrite. For examples of statements to this effect, attention is directed to U.S. Patent No. 2,452,529—J. L. Snoek—Magnet Core issued October 26, 1948; U.S. Patent No. 2,551,711—J. L. Snoek—Manganese Zinc Ferrite Core; thesis of E. W. Gorter entitled "Saturation Magnetization and Crystal Chemistry of Ferromagnetic Oxides"—University of Leydon—June 1954; Darken and Gurry—Journal of American Chemical Society—68(5)798–816 (1946); J. Smiltens—Journal of Chemical Physics 20, 990–994 (1952); thesis of George Economos entitled "A Study on Magnetic Ceramics," Massachusetts Institute of Technology—May 1954; and a series of articles on ferrites prepared by George Economos appearing in the Journal of American Ceramic Society, Vol. 38, pages 241–244, 292–297, 335–340, 353–357 and 408–411 (1955). From a study of the above disclosures, and others not listed, it is quite clear that hitherto ferrites have in most cases been manufactured by sintering a suitable mixture of ferrite-forming oxide raw materials. This method requires great skill since all kinds of factors, one of the most important of which is the choice of the gaseous atmosphere during sintering and subsequent cooling, greatly influence the electromagnetic properties of the reaction product. While many persons in the art have recognized this fact for sometime, no one has heretofore laid out in detail the firing schedules required in order to obtain the very best results reproducibly in the manufacture of the many different ferrite compositions known to the industry. J. Smiltens in this work, reported in Journal of Chemical Physics—vol. 20, pages 990–994 (1952), disclosed a technique for the firing and subsequent cooling of synthetic single crystal magnetite ($Fe_3O_4$) which is a ferrite having a single cation species. In his technique, Smiltens employed an equilibrium atmosphere firing and cooling schedule wherein the oxygen content of the ferrite being fired or cooled is at all times in equilibrium with the oxygen content of the atmosphere surrounding it so that no net gain or loss of oxygen occurs with respect to the ferrite. However, Smiltens' schedule can be profitably applied only to the particular single cation species ferrite composition ($Fe_3O_4$) employed in his experiments, and is not applicable to the many different synthetic ferrite compositions now employed by the industry, which are all two or more cation specie ferrites.

The present invention provides a method of making superior ferrites which employs an equilibrium atmosphere approach (and for that reason might be said to be analogous to Smiltens' technique); however, in the present invention applicant has discovered and discloses a "Universal Equilibrium Atmosphere Diagram" which is applicable to all known ferrite compositions, and particularly to ferrites having two or more cation species.

It is therefore the primary object of this invention to provide precise and universally applicable data from which the firing and cooling schedule for a large number of different ferrite compositions can be readily determined, and by means of which ferrites having predetermined and superior magnetic properties can be reproducibly manufactured in large quantities.

In practicing the invention, a method of manufacturing is disclosed which deals with the preparation by means of equilibrium atmospheres of ferrites containing two or more different cation species. The commercially important three cation ferrites (Mn—Zn—Fe), (Ni—Zn—Fe) and (Mn—Mg—Fe) are examined in detail, and the results are included as examples. The applicability of the method to the two cation ferrites (Mn—Fe), (Ni—Fe), (Zn—Fe), (Cu—Fe) and (Mg—Fe) has been verified but in less detail. The prior art on magnetite, the one cation ferrite is reviewed since it defines a lower limit to all of these compositions, a limit which is approached as the amount of non-ferrous cations in the composition is decreased.

Other objects, features and many of the attendant advantages of this invention will be appreciated more readily as the same becomes better understood by reference to the following detailed description, when considered in connection with the accompanying drawings, wherein.

Figure 3:
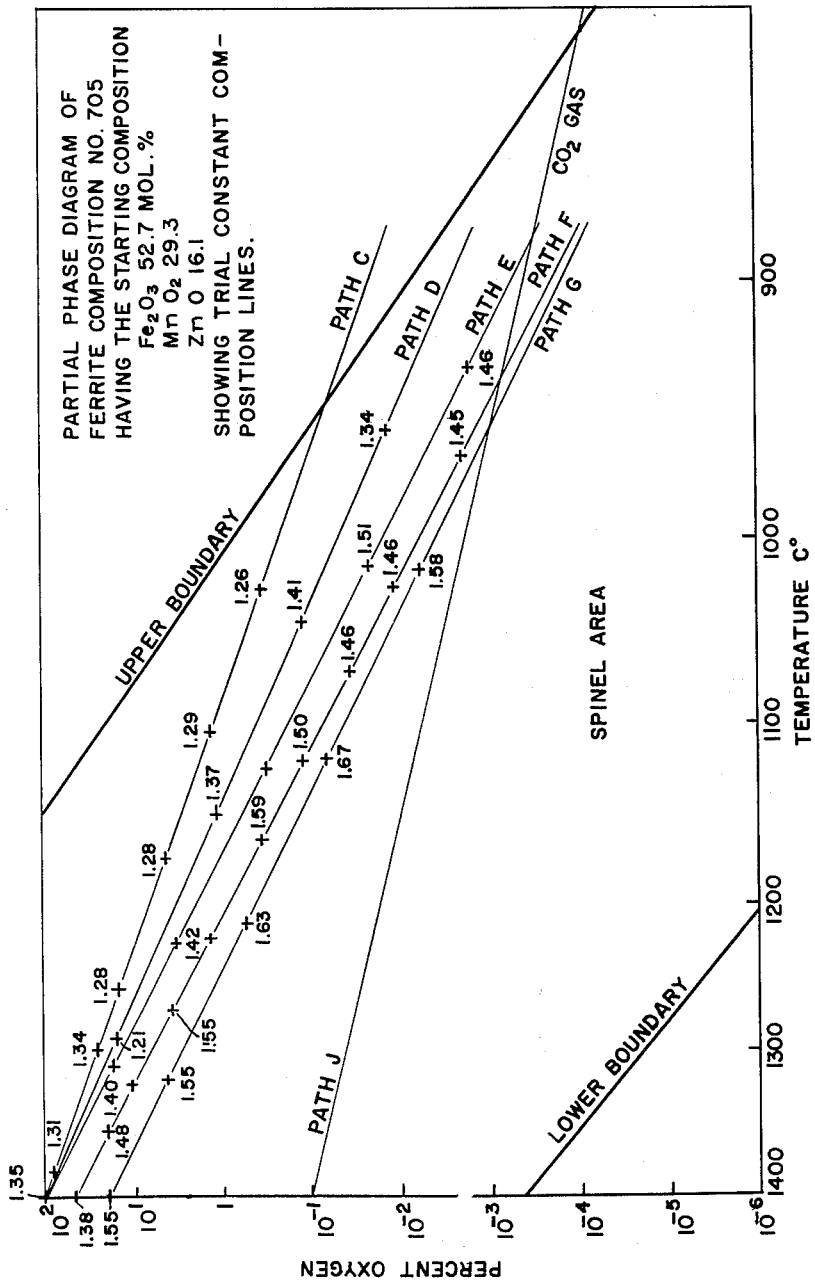
FIGURE 3 is a partial phase diagram of a ferrite material having the starting composition 52.7 mol. percent $Fe_2O_3$, 29.3 mol. percent $MnO_2$ and 16.1 mol. percent $ZnO$.
Figure 6:
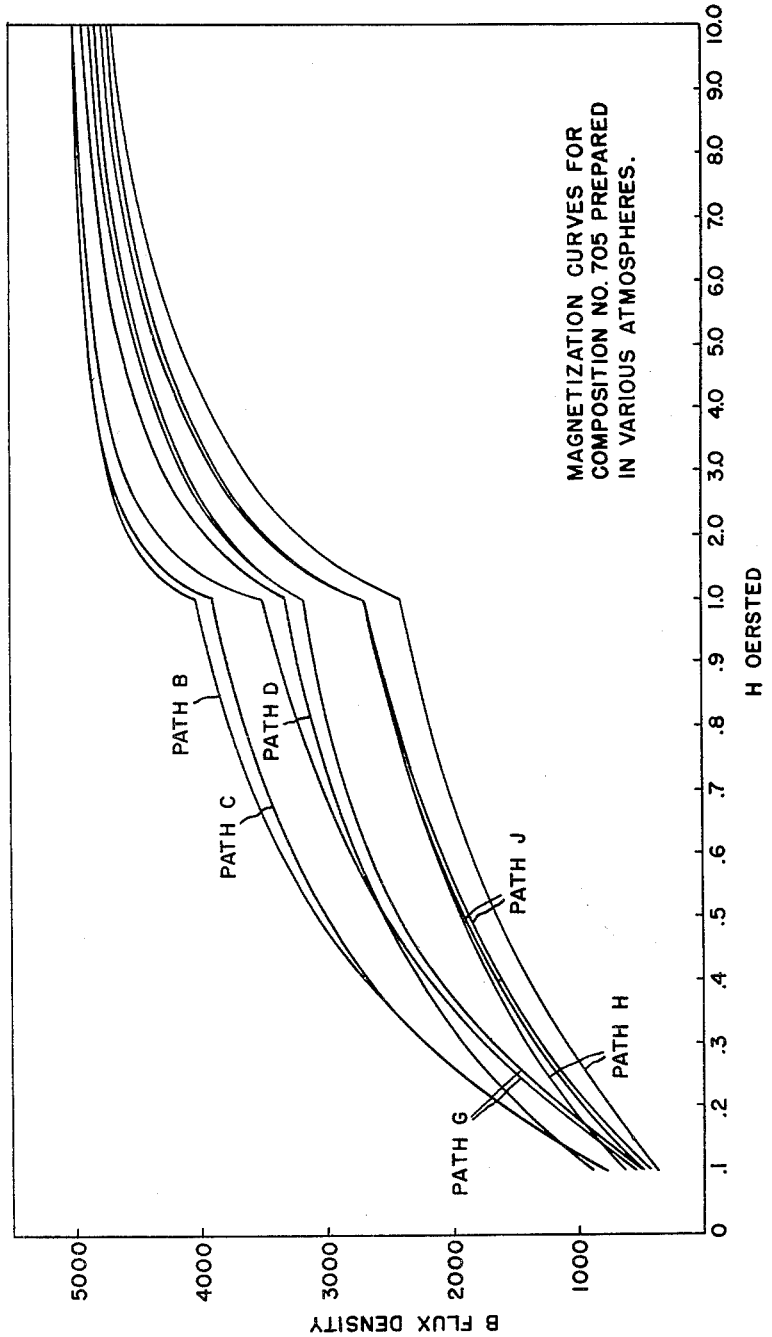
Figure 7:
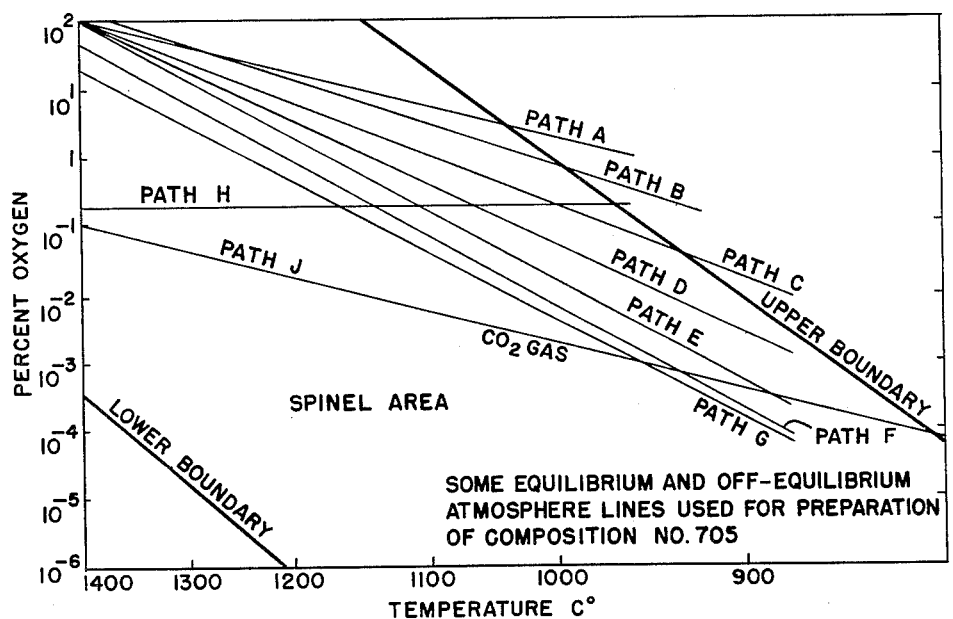
Figure 8:
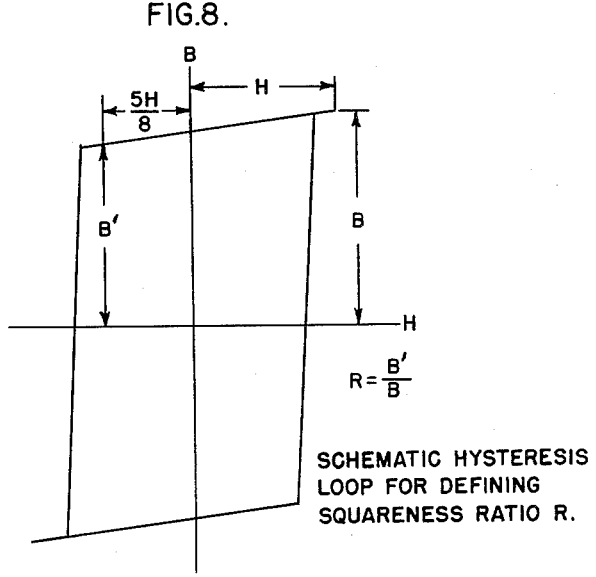

FIGURE 6 is a series of magnetization curves for the particular ferrite material whose starting composition is listed in connection with FIGURE 3, and whose partial phase diagram is illustrated in FIGURE 3 of the drawings, and illustrates the improvements in magnetic characteristics that can be obtained with a given ferrite composition by firing the same in various different atmospheres having different oxygen contents;

FIGURE 7 is a phase diagram to be used in conjunction with FIGURE 6, and illustrates the various equilibrium and off equilibrium atmosphere lines used in the preparation of the ferrite samples whose magnetization characteristics are plotted in FIGURE 6;

FIGURE 8 is a schematic hysteresis loop for use in defining the squareness ratio R of the square loop ferrites;

FIGURE 9 illustrates a series of curves which represent the lower phase boundary of the spinel area of the number of different ferrite compositions listed; and FIGURE 10 is a series of curves representing the upper phase boundary of the spinel area of the number of representative different ferrite compositions listed.

THE CRYSTAL CHEMISTRY OF FERRITES

The results achieved by the "method for manufacturing ferrites" to be described below involve certain details of the location of the various atoms which make up the ferrite, and of the valence of these atoms (ions). To assist one in understanding the method, it is deemed desirable to include the following material concerning the crystal chemistry of ferrites.

From the atomic point of view each crystallite of a ferrite may be regarded as having a skeleton of oxygen atoms. These oxygen atoms are arranged in a closely packed orderly fashion. They are packed in an arrangement similar to the arrangement you would use if you wished to pack tennis balls in a box as efficiently as possible. To carry the analogy a little further—no matter how efficiently tennis balls are packed in a box, unless they are severely deformed, the spaces in between will be big enough to allow marbles to fit in. In the ferrite the metal atoms occupy the spaces in between oxygen atoms like the marbles in between the tennis balls. All the "spaces in between" the oxygen atoms are not occupied by metal atoms. In fact only certain specific spaces are occupied, and these specific spaces form a pattern which is repeated over and over again through the ferrite. This pattern occurs in many different minerals and compounds and is called a spinel pattern or more properly a spinel structure.

It is not hard to imagine an ideal ferrite having a formula of the form $[M^{II}OFe_2^{III}O_3]$ in which large numbers of spinel patterns repeat in space with all specified spaces occupied by appropriate atoms. Real ferrites differ from the ideal in many respects. Two significant differences concern us in this disclosure:

(1) The ratio of one divalent metal $M^{II}$ to two trivalent iron ions implied by the formula $[M^{II}OFe_2^{III}O_3]$ cannot be achieved in practice. Some small deviation from an exact one to two ratio will always exist. In fact a great many practical ferrite formulations deliberately choose the ratio different than one to two to avoid the ambiguity. In the discussion which follows we will discuss the case where there is more iron than required for the exact one to two ratio.

(2) For practical reasons, the ferrite, hence the spinel pattern, does not extend endlessly. At some place the pattern stops. If this place is an external face we have a ferrite in contact with some atmosphere. At a face where a ferrite is in contact with an atmosphere there will be an exchange of atoms between them. The number of atoms exchanged may be completely negligible under some circumstances but very significant under others. It is the exchange of oxygen atoms between the ferrite and the surrounding atmosphere and the use and control of this exchange which is the subject of this disclosure.

At temperatures below 500° C. and ambient atmosphere oxygen pressures in the range between $10^{-6}$ atmospheres and one atmosphere the oxygen exchange between a ferrite and the ambient atmosphere is practically negligible. At temperatures between 500° C. and 1000° C. and oxygen pressure between $10^{-6}$ atmosphere and one atmosphere the oxygen exchange is slow but observable. At temperatures above 1000° C. the oxygen exchange is relatively rapid. Since in the manufacture of most synthetic ferrites, they are sintered at a temperature in excess of 1000° C., the oxygen exchange becomes of considerable importance.

Let us consider then a ferrite slightly rich in iron which by a suitable process has been caused to have iron of two valences in the proper proportions to approach the ideal ferrite in composition and in structure. By this I mean a formula $$[M^{II}_{(1-x)}+Fe_x^{II}]O \cdot Fe_2^{III}O_3$$

and a structure in which all spinel atom-sites are occupied. As long as the temperature and the oxygen content of the surrounding atmosphere are maintained at proper values called the equilibrium values of temperature and oxygen content for the ferrite in question, there will be as many oxygen atoms enter a ferrite from the atmosphere as enter the atmosphere from the ferrite. There will be no net gain or loss of oxygen to the ferrite. For every temperature at which the ferrite can exist there is a distinct value of the oxygen content of the surrounding atmosphere for which there will be no net loss or gain of oxygen to the ferrite. These sets of corresponding temperatures and oxygen contents are the subject of the present disclosure.

If the oxygen content of the surrounding atmosphere is less than the equilibrium value at a particular temperature and the temperature is high enough that oxygen exchange between the ferrite and the atmosphere is relatively rapid ($T > 1000°$ C.), as oxygen atoms leave the surface of the ferrite the metal atoms are exposed. Some of these leave with the oxygen but others attempt to find new positions among the empty spaces between oxygen atoms in the ferrite. But if all the positions prescribed by the spinel structure pattern are filled the metal atoms have to occupy non-spinel positions. When this happens the regions of the material thus invaded no longer have a spinel pattern of atoms and in fact are no longer ferrite. If a cross section of a ferrite body is polished to a mirror-like finish and examined under a microscope the non-ferrite portions are easily distinguished by their color which is darker than the ferrite part. This lack of ability of the ferrite to accommodate additional metal atom turns out to be a very convenient indicator for the determination of equilibrium values of temperature and oxygen content of the surrounding atmosphere for ferrites.

It is of interest how one knows that this picture is correct. The departure of oxygen from the ferrite is accompanied by a change of valence of some of the $Fe^{3+}$ ($Fe^{III}$) ions to $Fe^{2+}$ ($Fe^{II}$) ions to maintain the electrical balance of the system. It is observed that when a chemical analysis for $Fe^{2+}$ ions shows that there are more present than required by the formula

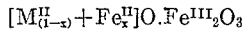
$$[M^{II}_{(1-x)} + Fe^{II}_x]O \cdot Fe^{III}_2O_3$$

the non-ferrite material makes its appearance.

When the oxygen content exceeds the equilibrium value at a particular temperature more oxygen atoms arrive at a ferrite surface than leave the surface. Metal atoms from inside the ferrite migrate into the spaces between the newly arrived oxygen atoms to occupy spinel pattern positions. When this happens there are not enough metal atoms to fill all available spinel position; however, this condition does not necessarily lead to the formation of non-spinel, that is non-ferrite material. The material is observed both in microscopic examination and in crystal structure as indicated by X-ray analysis to retain the spinel-like pattern even though some metal positions are vacant. This non-ideal ferrite material is characterized by a deficiency of divalent ions, an excess of trivalent ions (the gain of oxygen by the ferrite is accompanied by an increase in valence by a portion of the metal ions to maintain the electrical balance of the system) and vacant spinel metal positions. There is a limit beyond which this "thinning out" of metal ions cannot proceed. When this limit is exceeded the spinel pattern distorts into a distinctly different structure recognizable by microscopic and X-ray examination. This limit too can be defined for a given ferrite in terms of maximum allowable oxygen content of the surrounding atmosphere at any particular temperature. These values are also the subject of this disclosure.

There is a difference in the characteristics of the ferrite as it approaches the upper limit of oxygen content as compared to its characteristics as it approaches the lower limit. It was noted that on the spinel side of the lower limit of oxygen content the ferrite always had the ideal spinel pattern of all positions full and an exact 2 to 1 ratio of trivalent metal ions to divalent metal ions regardless of temperature. There is not this same "constant composition" feature as one approaches the upper limit of oxygen content from the spinel side. At high temperatures the spinel pattern can be maintained for a relatively greater thinning out of metal ions while at lower temperatures relatively less thinning out can be tolerated.

According to the present invention, desired ferrites of non-ideal structure and greater than exact 2 to 1 ratio of trivalent to divalent metal ions, can be formed by suitable control of oxygen content of the surrounding atmosphere in which these ferrites are sintered and subsequently cooled. It is these ferrites and the procedure for making them which is the prime concern of this disclosure.

It should be emphasized that at any temperature high enough to permit rearrangement of metal ions among the spinel positions of a ferrite, there are distinct values of trivalent to divalent metal ion ratios, and of vacant metal ion sites in the ferrite associated with each value of oxygen content in the surrounding atmosphere for all values between the upper and lower limits of oxygen content at that temperature. The situation amounts to the fact that the chemical and structural composition of a ferrite are not uniquely determined by the proportions of the starting ingredients alone. Instead, there is a continuity of compositions, all truly ferrite in structure, which are obtainable by proper choice of the oxygen content of the surrounding atmosphere at sintering temperatures and during cooling after sintering. These compositions offer new possibilities for improved ferrite magnetic core materials.

THE EQUILIBRIUM ATMOSPHERE DEFINED

Up to now there has been no great difficulty associated with forming ferrite at high temperatures. The problems arise when one considers how to cool the ferrite to room temperature without altering its unique properties. If the ferrite is cooled very quickly by removing it directly from the furnace to the outside, its unique properties can often be reasonably maintained; but the thermal shock of such quick cooling sets up internal mechanical stresses which are detrimental to magnetic properties at best, and which will fracture ferrite bodies of any appreciable size. Hence, it can be appreciated that rapid cooling is not a satisfactory solution in any but very special cases. There is another possibility however. If, as the temperature of the ferrite is lowered from the high temperature at which its unique properties are established, the oxygen content of the surrounding atmosphere is also lowered an appropriate amount, a condition can be maintained in which there is no net gain or loss of oxygen to the ferrite, and consequently no change in properties. The appropriate values of temperature and oxygen content of the surrounding atmosphere for maintaining the conditions described above, is defined as the equilibrium atmosphere, and the specification of these appropriate values of temperature and oxygen content of the surrounding equilibrium atmosphere to be used in cooling ferrites, is a principal part of this disclosure. When these specifications are followed it is possible to reproducibly prepare a great variety of unique ferrite compositions in a way which preserves their chemical homogeneity and freedom from mechanical stresses.

The name "equilibrium atmosphere" is not entirely descriptive in that it implies that there is some single gas or gas mixture which is in equilibrium with the ferrite at all temperatures. The constitution of the equilibrium atmosphere is a rapidly changing function of temperature. However, the name will be used here since the true situation should be abundantly clear from this disclosure. Also, there is in existence a misconception about the interaction between ferrites and the surrounding atmosphere that should be mentioned. One finds occasional references to the use of neutral or "protective" atmosphere in connection with ferrite processing. Examination will show that the authors mean by this the use of the inert gases, argon, helium, nitrogen, and in some case $CO_2$ and steam. It is true that argon and helium and nitrogen do not react with ferrite. But suppose an absolutely oxygen free inert gas surrounds a ferrite at high temperature. There is and must be a loss of oxygen from the ferrite until some finite concentration of oxygen builds up in the surrounding atmosphere. In practice these inert gases are usually flowed past the ferrite continuously so that no such concentration could build up. In this case the inert gases would in effect be reducing atmospheres. Actually, commercial gases seldom contain less than one part per million of oxygen, and more often 20 parts per million or more. This seems little enough, but it is an essential which keeps these gases from being ruinous in many cases. It should be clear by this time that a truly neutral gas, that is a single gas which prevents either gain or loss of oxygen to a ferrite, in general does not exist. It will be seen that $CO_2$, steam, mixtures of $CO_2$ with CO, $CO_2$ with $H_2$, $CO_2$ with $O_2$, steam with $H_2$, steam with $O_2$ make rather better approximations to the requirements of a neutral gas in certain cases than do the inert gases because $CO_2$ dissociates as follows—$2CO_2 \rightleftarrows 2CO + O_2$ and steam dissociates as follows—$2H_2O \rightleftarrows 2H_2 + O_2$. The amount of oxygen furnished by the last-mentioned means varies with temperature in the desired direction. No single mixture of gases in constant proportions is a good neutral atmosphere because the amount of oxygen in general does not vary at the right rate with changes in temperature. The definition of equilibrium atmosphere herein proposed is rigorous, and therefore difficult to achieve. A less rigorous definition, and probably the one really meant by other authors, is that the gas be neither so reducing nor so oxidizing as to cause the formation of non-spinel material in the bodies by either of the two mechanisms discussed earlier. A more appropriate name for such gases might be non-destructive rather than neutral which they really are not. It is also worth noting that practically any gas atmosphere ultimately becomes a neutral atmosphere if given sufficient time in contact with a ferrite at a particular temperature because the ferrite changes compositions by gaining or losing oxygen until it equilibrates with the atmosphere. This is not usually the desired result.

The use of equilibrium atmospheres concerns itself especially with the changes taking place in the ferrite during cooling.

There are two other ferrite processes which are concerned with changes during cooling which superficially appear to resemble the equilibrium atmosphere methods described herein but are in fact distinctly different.

One of these processes is associated with the names of Kriessman and Harrison (see Physical Review, vol. 103, 1956, pp. 851–857). This process makes use of the rate of cooling to promote or inhibit certain ionic rearrangements of metal ions among the available spinel pattern positions. By contrast, the present process is concerned with control of the relative numbers of ions of different value, and of the relative numbers of vacant sites occurring in a ferrite. The subject process attempts to maintain status-quo. The fact that ferrite samples are cooled at all means that some rearrangements of ions will be encountered since these rearrangements are unavoidable facts of nature. On the other hand, the application of slow cooling (without appropriate adjustment of oxygen content) to obtain maximum rearrangement of ions may be penalized in its results by the failure to control valences and vacant sites as is done in the subject process.

The other process is that of Snoek in which conditions are arranged to assure a maximum gain of oxygen to the ferrite as for example, slow cooling in oxygen of bodies in which appreciable porosity is deliberately introduced. Again, by contrast, Snoek's process endeavors to add oxygen to the ferrite to lower $Fe^{2+}$ content. The present process endeavors to eliminate both gain and loss of oxygen to the ferrite, and may encourage $Fe^{2+}$ formation on occasion.

MAGNETITE (FERROUS FERRITE)

Figure 1:
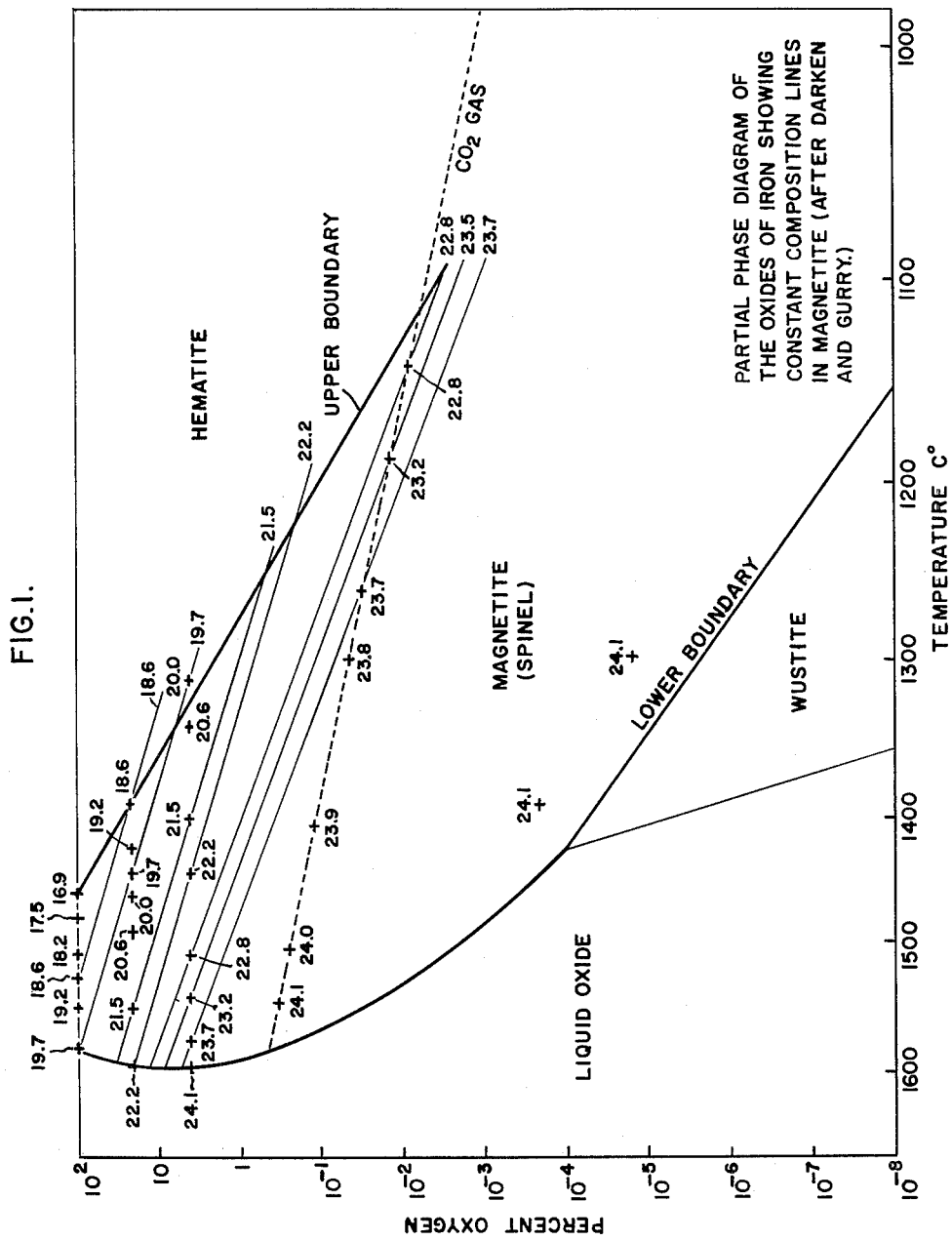
FIGURE 1 is a partial phase diagram illustrating what happens to oxides of iron when they are sintered at various temperatures in atmospheres having the various percent oxygen contents illustrated.

At the outset the data of Darken and Gurry (cited above) on magnetite were useful in determining the equilibrium atmospheres for the many ferrites investigated. These data are plotted in FIGURE 1. The units of the coordinate axes need a word of explanation. In FIGURE 1, the percent oxygen is plotted on a logarithmic scale. The temperature is plotted on a reciprocal of absolute temperature scale. The relative location of each temperature on this scale is determined by converting from centigrade to absolute values then calculating the reciprocal of this number. After the position of a temperature in this scale is located, it is more convenient to label it with its centigrade temperature so that data can be plotted directly on the scale. There are important thermodynamic reasons for choosing these coordinates which will be presented later.

The heavy lines drawn in FIG. 1 map out the upper and lower limiting values for magnetite of percent oxygen in the surrounding atmosphere at corresponding temperatures. Values of percent oxygen and temperature in the area marked "Hematite" cause the formation of non-spinel material due to too much oxygen in the magnetite. Similarly values of percent oxygen and temperatures in the area marked "Wustite" cause the formation of non-spinel material due to too little oxygen in the magnetite. The line which forms the high temperature boundary of the magnetite and wustite areas gives the percent oxygen and temperature values for melting. Note that the melting temperature depends strongly on the oxygen content of the surrounding atmosphere.

The light weight lines and the numbers written into the magnetite spinel area are part of the Darken and Gurry data, but were not plotted in this way by Darken and Gurry. They analyzed for $Fe^{2+}$ content in magnetite samples which were in equilibrium with their surrounding atmospheres for the values of percent oxygen and temperature indicated by the crosses. They reported their results in terms of ratio of $Fe^{2+}$ to total iron content. I chose to calculate back to their raw data to obtain the percent $Fe^{2+}$ by weight. The numbers written in beside the crosses are these weight percent $Fe^{2+}$ values. The light tie lines are lines of constant $Fe^{2+}$ content, and, hence, are the desired "equilibrium atmosphere" lines for making some of the many possible magnetite spinels in this system.

The dash line in FIG. 1 passes through the percent oxygen values obtained from the dissociation of $CO_2$ gas at corresponding temperatures. It is worth noting that the changes in $Fe^{2+}$ content with changes in percent oxygen are much more rapid above this line than below it. Values of $Fe^{2+}$ content along the $CO_2$ line are relatively near the 24.1% value near the wustite phase boundary. As a consequence, not much change is made in magnetite by rather large variations in percent oxygen values for values between the $CO_2$ line and the wustite boundary.

It is also interesting to note that nature does not actually allow one to follow most of the equilibrium atmosphere lines that can be plotted from the data of Darken and Gurry for magnetite spinel all the way down to room temperature because they can be seen to cross the hematite phase boundary above 900° C. Consequently, at the crossing temperature some non-spinel material will form unless cooling proceeds very rapidly from the point, and as set forth previously, such rapid cooling may set up mechanical stresses within the ferrite which adversely affect its magnetic properties. Fortunately, the situation with other ferrites is more favorable.

MANGANESE—ZINC FERRITE

Figure 2:
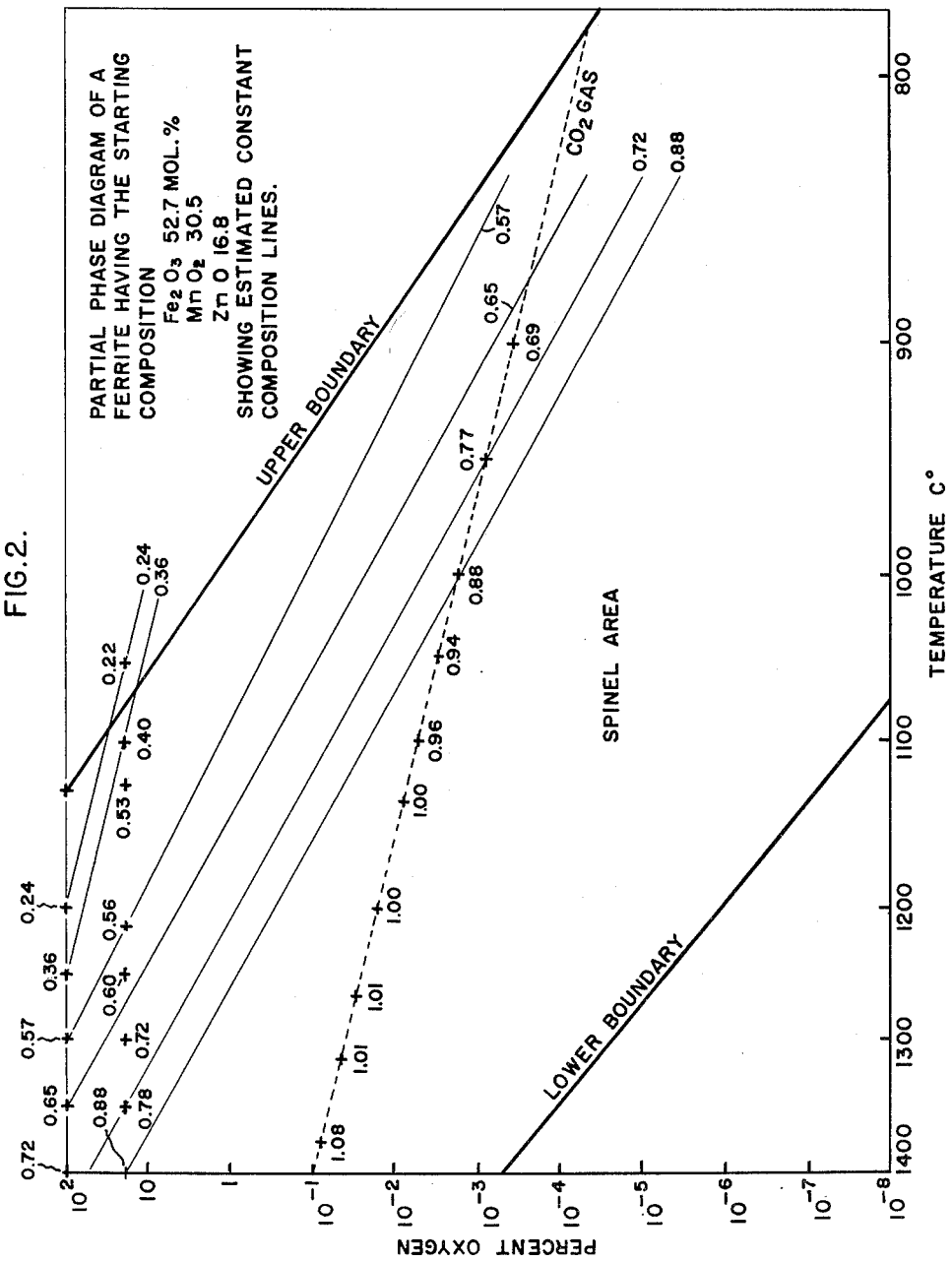
FIGURE 2 is a partial phase diagram of a ferrite material having the starting composition 52.7 mol. percent $Fe_2O_3$, 30.5 mol. percent $MnO_2$ and 16.8 mol. percent $ZnO$.

The original work of this disclosure was done on a manganese-zinc ferrite, and is displayed in FIG. 2.

The same mode of representation is used as in FIG. 1. The results have a resemblance to magnetite although the details are quite different. The wustite phase boundary (lower limit) is displaced upward about 1 decade. The hematite phase boundary (upper limit) is displaced about 4 decades. This results in a much wider spinel area for this particular ferrite than for the magnetite ferrite. The $Fe^{2+}$ analysis values of the MnZnFe ferrite are about one tenth that of magnetite, and as can be appreciated from an examination of FIG. 2, many of the equilibrium atmosphere lines stay inside the spinel area to 800° C. and lower. This means that MnZnFe spinels containing no non-spinel material can be cooled to room temperature along these equilibrium atmosphere lines or other lines which can be interpolated between them. In practice homogeneous spinel material can be made with $Fe^{2+}$ analysis values as low as 0.60% by using the starting composition identified in FIG. 2.

FIG. 3 is a percent-oxygen vs. temperature diagram for a second MnZnFe ferrite of a slightly higher Fe content than that of FIG. 2. It has the same general form as the first two figures; however, the spinel area is a little narrower than in FIG. 2 but still much wider than FIG. 1. This would be expected from the fact that the composition is between magnetite and the MnZnFe ferrite of FIG. 2. In FIG. 3 the constant oxygen content lines were estimated from the results of FIG. 2, and a batch of samples were cooled along the estimated lines. Those were then confirmed by quick cooling samples at the conditions of atmosphere and temperature indicated by the crosses from a batch of samples being cooled slowly according to the estimated respective equilibrium atmosphere lines. The $Fe^{2+}$ values are such as to be essentially constant along the trial lines.

Again, it can be seen in FIG. 3 that many of the constant oxygen content lines do not cross the hematite phase boundary above 900° C. so that subsequent cooling to room temperature can be accomplished safely without the formation of undesired non-spinel material. In practice homogeneous spinel material can be made with $Fe^{2+}$ analysis values as low as .80% by weight using the starting composition of FIG. 3.

The manganese iron (MnFe) ferrites with or without zinc (Zn) proved especially suitable for an investigation of the type described above. All the reasons for the suitability of these ferrites are probably not known yet, but several are present. They are:

(1) The MnFe ferrites studied here achieve no more than 95% ideal (X-ray) density. Intuition suggests that there are relatively many diffusion paths for ions in this situation.

(2) The spinel areas for the compositions of FIGURES 2 and 3 have boundaries relatively close to those for magnetite. This is an advantage. The key information about these ferrites is obtained within a few decades of oxygen content from the "hematite-like" phase boundary of the spinel area. When this boundary is located well beyond the 100% oxygen line at all temperatures above 1000° C., less of the key region is easily accessible for examination. It should be pointed out that atmosphere containing more than 100% oxygen have the following significance: 100% oxygen means oxygen at a pressure of one atmosphere. 200% oxygen means oxygen at a pressure of 2 atmospheres. 300% oxygen means 3 atmospheres, etc. It will be seen that the use of oxygen pressures beyond one atmosphere appear to be desirable to produce better ferrite materials, although from a practical standpoint it presents problems.

(3) MnFe ferrites dissolve relatively easily in HCl for chemical analysis. When the time required for dissolving the ferrite extends to many hours at it does for NiFe ferrites, the possibility of oxidation of the ferrite during the dissolving process is increased. This introduces greater uncertainty into the results of the analysis.

NICKEL ZINC FERRITE

Figure 4:
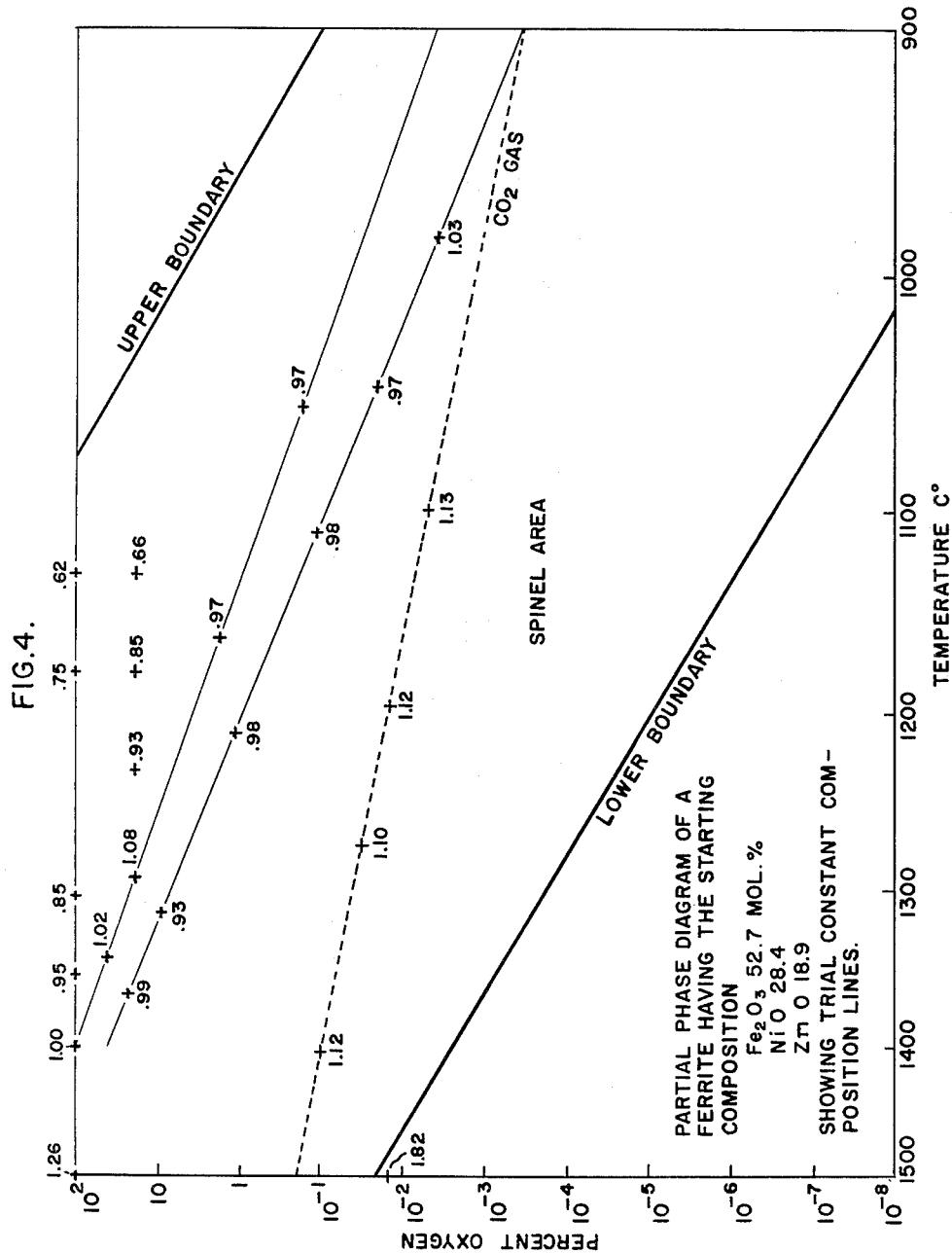
FIGURE 4 is a partial phase diagram of a ferrite material having the starting composition 52.7 mol. percent $Fe_2O_3$, 28.4 mol. percent $NiO$ and 18.9 mol. percent $ZnO$.

In FIG. 4 is shown the percent-oxygen vs. temperature diagram for a nickel zinc (NiZn) ferrite which is analogous to the diagram for the MnZnFe ferrite of FIG. 2. The boundaries of the spinel area for this NiZn ferrite are located about half a decade higher in percent oxygen values than the corresponding boundaries in the analogous MnZnFe ferrite. It is not unexpected then that the $Fe^{2+}$ analysis values for the nickel ferrite are somewhat higher than for the manganese ferrite under the same conditions of percent oxygen and temperature. To put it another way an atmosphere of given oxygen content is relatively more reducing to the nickel ferrite than to the manganese ferrite.

The nickel ferrites, in this composition range at least, exchange oxygen with the surrounding atmosphere much slower than do the manganese ferrites. This is an obstacle to the chemical investigation of the interaction between nickel ferrites and their surrounding atmospheres. On the other hand this slowness of interactions is an aid to the process of making homogeneous ferrites of a given $Fe^{2+}$ analysis value. The two trial "equilibrium atmosphere" lines in FIG. 4 are seen to exhibit rather well the property of being lines of constant $FE^{2+}$ analysis for this ferrite.

In the ferrites considered thus far it has been possible in principle at least to determine the location of equilibrium atmosphere lines by systematic preparation and $Fe^{2+}$ chemical analysis of ferrite samples under the many possible conditions of temperatures and percent oxygen in the surrounding atmosphere. Actually, this procedure was used only for the first MnZnFe ferrite. The equilibrium atmosphere lines thus obtained were then extrapolated to predict trial lines used in subsequent searches. The correctness of these trial lines was then checked by $Fe^{2+}$ analysis of a batch of ferrite sample cooled slowly along these lines with individual samples being quickly cooled from various temperature points along the line.

THEORY

It will be enlightening to look at a thermodynamic equation which applies to a ferrite being heated or cooled along a line of constant $Fe^{2+}$ analysis value. This equation has the same form as the Clausius-Claperon equation which gives the relationship involving the vapor pressure, temperature, and latent heat of vaporization of a substance in equilibrium with its own vapor. For ferrites this equation is $$\frac{d(\ln P_{O_2})}{d(1/T)} = -\frac{\Delta Hv}{R}$$

The derivative on the left side of the above equation is by definition the slope of a curve in a graph in which the coordinates are $\ln P_{O_2}$ and $1/T$. $P_{O_2}$ is the partial pressure of oxygen in fractions of an atmosphere, and numerically equal to the percent oxygen divided by 100. The "l n" symbol means that a logarithmic scale is used. The $(1/T)$ means that the other scale is a reciprocal of absolute temperature scale. These will be recognized as the coordinates of the phase diagrams we have been discussing. Therefore, this equation is a statement about the slope of certain special lines in our graphs above.

The properties of these special lines are a consequence of the assumptions used in deriving the above equation:

(1) That the equation deals only with a ferrite under such conditions of percent oxygen and temperature that prevent any exchange of oxygen with the surrounding atmosphere.

(2) That oxygen is the only constituent in the system that can exchange between the ferrites and the atmosphere.

These assumptions are the definitions of equilibrium atmosphere lines. Consequently the equation says that the slope of these lines equals a quantity $$-\Delta \frac{Hv}{R}$$

$\Delta Hv$ is the heat that must be supplied to "boil off" one gram molecule of oxygen from a very large quantity of ferrite, large enough that the loss of one mole of oxygen has negligible effect on the composition. When oxygen is taken in by a ferrite it gives off heat so that in a sense the ferrite "burns" in this reaction. This quantity is approximately a constant in the ferrites examined in this disclosure. R is the universal gas constant.

The value of this equation arises from the fact that in the ferrites examined here, the lower boundary of the spinel area is itself a line of constant $Fe^{2+}$ values. Locating this line is emperical and depends on microscopic examination of samples prepared close to the line above and below it. It does not depend on chemical analysis. This means that in ferrite systems where there is no convenient analysis, like the $Fe^{2+}$ chemical analysis for checking equilibrium atmosphere lines, it is possible to get a good approximation to the slope of these lines from the slope of the lower boundary of the spinel area. The knowledge of the slope of these lines is all that is needed to construct an equilibrium atmosphere line passing through any point in the percent oxygen-temperature diagram.

It is worth while to reexamine the equilibrium atmosphere lines of FIGURES 1, 2, 3 and 4 in the light of this new meaning. The slopes of the lines are negative, i.e., they go "uphill" to the left. This means that $\Delta Hv$ is positive. Therefore, these ferrites all act in the same way requiring the addition of heat to boil off oxygen, absorbing heat when reacting with oxygen. Since the Fe in all of these ferrites plays a primary role in the reaction with oxygen, it is not surprising that there is similarity in the pattern of equilibrium atmosphere lines among these ferrites.

It should be noted that the slope of the equilibrium atmosphere lines is less steep for the lines which are further removed from the "wustite-like" boundary of the spinel area. There is a thermodynamic expression for the change of slope of those lines which can be invoked if needed. This is mentioned here only to indicate that there is no lack of theoretical guideposts which can be used when chemical analysis is not possible or convenient.

THE UNIVERSAL EQUILIBRIUM ATMOSPHERE DIAGRAM (*A Synthesis*)

Figure 5:
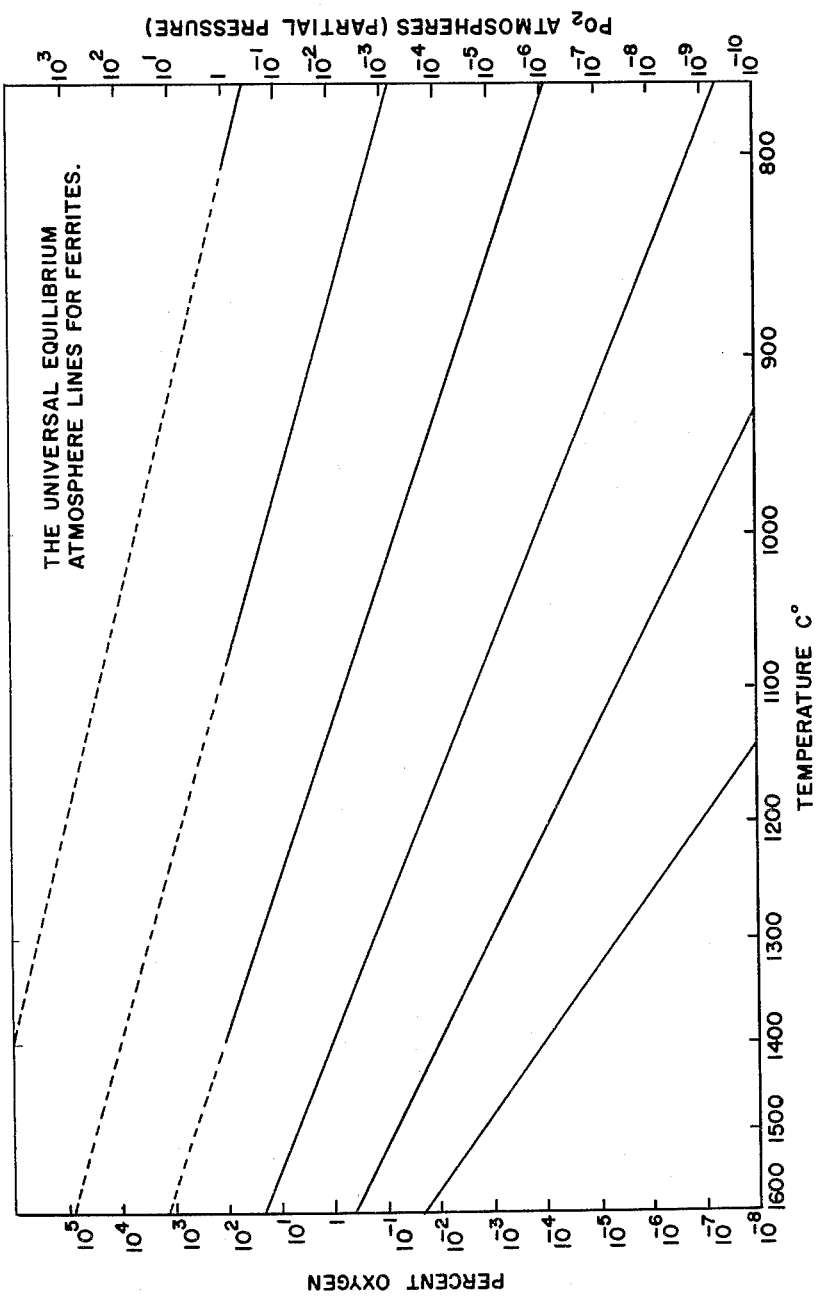
FIGURE 5 is a phase diagram believed applicable to all ferrite compositions, and illustrates a set of universal equilibrium atmosphere lines for use in the firing and subsequent cooling of various known ferrite compositions.

The thermodynamic principles and the data of FIGURES 1, 2, 3, and 4 enable one to draw a family of "universal" equilibrium atmosphere lines shown in FIG. 5, and listed in Table I.

TABLE I

[Tabular values of percent-oxygen at 100° centigrade intervals for six specimen equilibrium atmospheres]

| Line #1 | | Line #2 | | Line #3 | |
|---|---|---|---|---|---|
| Temp., °C. | Percent $O_2$ | Temp., °C. | Percent $O_2$ | Temp., °C. | Percent $O_2$ |
| 1,600 | ---------- | 1,600 | $8.3 \times 10^4$ | 1,600 | $1.3 \times 10^3$ |
| 1,500 | ---------- | 1,500 | $3.8 \times 10^4$ | 1,500 | $3.8 \times 10^2$ |
| 1,400 | $10^6$ | 1,400 | $10^4$ | 1,400 | $10^2$ |
| 1,300 | $3.2 \times 10^5$ | 1,300 | $2.9 \times 10^3$ | 1,300 | $2.3 \times 10^1$ |
| 1,200 | $9.6 \times 10^4$ | 1,200 | $6.8 \times 10^2$ | 1,200 | $4.1 \times 1$ |
| 1,100 | $2.2 \times 10^4$ | 1,100 | $1.3 \times 10^2$ | 1,100 | $5.9 \times 10^{-1}$ |
| 1,000 | $4.3 \times 10^3$ | 1,000 | $1.9 \times 10^1$ | 1,000 | $6.0 \times 10^{-2}$ |
| 900 | $6.3 \times 10^2$ | 900 | $2.1 \times 1$ | 900 | $4.5 \times 10^{-3}$ |
| 800 | $7.8 \times 10^1$ | 800 | $1.8 \times 10^{-1}$ | 800 | $2.4 \times 10^{-4}$ |

TABLE I.—Continued

| Line #4 | | Line #5 | | Line #6 | |
|---|---|---|---|---|---|
| Temp., °C. | Percent $O_2$ | Temp., °C. | Percent $O_2$ | Temp., °C. | Percent $O_2$ |
| 1,600 | $2.0 \times 10^1$ | 1,600 | $4.1 \times 10^{-1}$ | 1,600 | $1.9 \times 10^{-2}$ |
| 1,500 | $4.9 \times 1$ | 1,500 | $6.6 \times 10^{-2}$ | 1,500 | $1.6 \times 10^{-3}$ |
| 1,400 | $1$ | 1,400 | $10^{-2}$ | 1,400 | $10^{-4}$ |
| 1,300 | $1.7 \times 10^{-1}$ | 1,300 | $1.1 \times 10^{-3}$ | 1,300 | $5.5 \times 10^{-6}$ |
| 1,200 | $2.3 \times 10^{-2}$ | 1,200 | $8.1 \times 10^{-5}$ | 1,200 | $1.2 \times 10^{-7}$ |
| 1,100 | $2.2 \times 10^{-3}$ | 1,100 | $4.3 \times 10^{-6}$ | 1,100 | ---------- |
| 1,000 | $1.5 \times 10^{-4}$ | 1,000 | $1.8 \times 10^{-7}$ | 1,000 | ---------- |
| 900 | $6.8 \times 10^{-6}$ | 900 | ---------- | 900 | ---------- |
| 800 | $2.1 \times 10^{-7}$ | 800 | ---------- | 800 | ---------- |

These equilibrium atmosphere lines have the following property: Suppose a ferrite has reached equilibrium in its reaction with the oxygen in its surrounding atmosphere at some temperature and percent oxygen value on one of these lines. Then it will be possible to increase or decrease the temperature of the ferrite without appreciable net gain or loss of oxygen if the percent oxygen in the surrounding atmosphere is adjusted to the value indicated by the chosen equilibrium atmosphere line at the new temperature. This property is realized only if the ferrite maintains its spinel structure. It no longer applies if the ferrite melts or forms non-spinel deposits. No ferrite is known which maintains the spinel structure over the entire fourteen decades of percent oxygen content displayed in FIGURE 5. Consequently the entire plot does not apply to any known ferrite. Only the part of the plot of FIGURE 5 which lies in the spinel area of a particular ferrite will apply to that ferrite.

It is understood of course that interpolation is possible between any pair of lines shown in FIGURE 5, and that by means of such interpolation, the equilibrium atmosphere line for any given ferrite composition can be readily determined. The manner in which this interpolation can be accomplished will be described more fully hereinafter. The lines shown in FIGURE 5 establish the slope for all equilibrium atmosphere lines. These slopes were determined experimentally from magnetite and the several ferrites described above. It was surprising that one set of lines can specify the equilibrium atmospheres for all these ferrites; however, it was even more surprising to find that this set of equilibrium atmosphere lines applies just as well to the magnesium-manganese ferrites used for magnetic memory cores, a ferrite whose chemical composition is strikingly different from the ferrites discussed thus far. The evidence for this applicability consists of the fact that the lower boundary of the spinel area for the magnesium-manganese ferrite has the predicted slope, and the fact that samples of this ferrite respond well to cooling in the predicted equilibrium atmosphere. A possible reason for the existence of a set of universal lines may be that the slope of the equilibrium atmosphere lines are determined by the iron in all ferrites, and all ferrites, even magnesium-manganese memory core ferrites, contain more iron ions than all other cations combined. Perhaps the existence of universal equilibrium atmosphere lines can then be explained on the basis that the atmosphere behavior in all of ferrites is dominated by iron.

It should be noted that some portions of the universal equilibrium atmosphere lines shown in FIG. 5 are shown with dash lines. These portions of the lines are at pressures above 100% oxygen, i.e., above 1 atmosphere pressure of oxygen.

The universal equilibrium atmosphere lines shown in FIG. 5 extend from 800° to 1600° C. The upper temperature is near to or above the melting point of practically all ferrites. Below 800° C. the diffusion rates for the ions in the ferrites is slow enough that very close adherence to the equilibrium atmosphere lines is not required in order to produce ferrite materials having the desired magnetic characteristics. Thus, the most important part of these lines is displayed in FIG. 5. However, it is understood that these lines may be extrapolated either to higher or lower temperatures.

According to the invention, the equilibrium atmosphere lines of FIGURE 5 are applied to the high temperature heat treatment of ferrites during which the sintering is accomplished, and the subsequent cooling of the ferrites down to a temperature in the neighborhood of 900° C., below which further equilibrium atmosphere treatment is not required. The preparation and treatment of the ferrite up to this high sintering temperature may be by any conventional procedure. However, the high temperature treatment obviously must be performed in a furnace in which the oxygen content of the atmosphere around the ferrite can be controlled over a wide range of values. In the ideal case the rise in temperature would begin in an atmosphere containing an amount of oxygen appropriate to the desired equilibrium atmosphere line at room temperature and would be changed continuously in accordance with values of percent oxygen corresponding to the values indicated by the lines as the temperature increased. In practice nothing is sacrificed by using the percent oxygen during the rise which will be used at the highest temperature to be attained in the sintering treatment, say for example, 1400° C. in 100% oxygen. If a very close approach to chemical equilibrium is required, eight hours at 1400° C. will usually achieve this.

It is the cooling part of the treatment that is most critical. Ideally, the oxygen content of the atmosphere surrounding the ferrite should be changed continuously during cooling in order to pass through the values for a particular example. However, from a practical operating standpoint it is not desirable to continuously follow down a desired equilibrium atmosphere line. Instead, a stepwise approximation to such desired equilibrium atmosphere line is much easier to achieve in practice, and accordingly, a stepwise reduction in temperature of the ferrite such as that suggested below, is recommended.

| Percent $O_2$: | T., ° C. |
|---|---|
| 100 | 1400 |
| 21 | 1300 |
| 4.0 | 1200 |
| 0.56 | 1100 |
| 0.056 | 1000 |
| Etc. | Etc. |

It is not too tedious to do this in 100 stepwise reductions for the whole cooling cycle, and good results are obtained. Not as good but still acceptable results can be obtained in a lesser number stepwise reduction in temperature of the ferrite, such as a three step approximation as follows:

| Percent $O_2$: | Temperature range, ° C. |
|---|---|
| 100 | 1400 to 1300 |
| 4.0 | 1300 to 1100 |
| .056 | 1100 to 900 |
| .0001 | 900 to room temp. |

In this approximation the atmosphere is alternately too oxidizing before a step through too reducing after the step, but the schedule is balanced in such a way as to "average out" to the result desired. This procedure has two drawbacks: (1) it usually fails to average out exactly, (2) the ultimate diffusion of ions into and out of the ferrite seems to adversely affect the ferrite but not too badly.

The least satisfactory approximation is the one step reduction in which an attempt is made to find a temperature at which the atmosphere is changed in one step, for example, from 20% $O_2$ to .001% $O_2$. The selection of the temperature at which to make the change is usually extremely critical, and results are not only mediocre, but are difficult to reproduce as well.

*Manner of applying Universal Equilibrium Atmosphere Diagram to New Ferrite Compositions*

As indicated earlier, the entire set of Universal Equilibrium Atmosphere Lines illustrated in FIGURE 5 do not all apply to any single known ferrite composition. In utilizing the Universal Equilibrium Diagram, it is appropriate to determine first what part of the set of lines of FIGURE 5 apply to the particular ferrite composition under consideration. This is accomplished by specifying the upper and lower percent oxygen limits which are compatible with a 100% spinel crystal pattern for the particular ferrite composition in question. Several important percent oxygen-temperature lower boundaries are shown in FIGURE 9. The lower boundary for magnetite occurs at the lowest percent oxygen values of any ferrites thus far examined. About one decade higher in percent oxygen is the lower boundary for the MnZnFe ferrite having the starting composition—

| | Mol percent |
|---|---|
| $Fe_2O_3$ | 54.6 |
| $MnO_2$ | 29.3 |
| $ZnO$ | 16.1 |

The lower boundary for this ferrite is practically indistinguishable from that for the ferrite composition plotted in FIGURE 2, and comprising—

| | Mol percent |
|---|---|
| $Fe_2O_3$ | 52.7 |
| $MnO_2$ | 30.5 |
| $ZnO$ | 16.8 |

A similar situation is found in the NiZnFe ferrites. The lower boundary for a ferrite with starting composition—

| | Mol percent |
|---|---|
| $Fe_2O_3$ | 52.7 |
| $NiO$ | 28.4 |
| $ZnO$ | 18.9 | is shown in FIGURES 4 and 9. It is practically indistinguishable from a ferrite with the starting composition—

| | Mol percent |
|---|---|
| $Fe_2O_3$ | 54.6 |
| $NiO$ | 27.2 |
| $ZnO$ | 18.2 |

The lower boundary for memory core type ferrites occurs at relatively high percent oxygen values. The boundary shown in FIGURE 9 is for a ferrite with starting composition—

| | Mol percent |
|---|---|
| $Fe_2O_3$ | 44 |
| $MgO$ | 41 |
| $MnO$ | 15 | but it is practically indistinguishable from a ferrite having the starting composition—

| | Mol percent |
|---|---|
| $Fe_2O_3$ | 40 |
| $MgO$ | 38 |
| $MnO$ | 22 |

The lower boundary for a NiZn ferrite with starting composition—

| | Mol percent |
|---|---|
| $Fe_2O_3$ | 48.7 |
| $NiO$ | 23.8 |
| $ZnO$ | 27.5 | occurs at the highest percent oxygen values of the several shown in FIGURE 9.

From these five lower boundaries it is possible to get an estimate of the location of the lower boundaries of a large number of other ferrite compositions. For example, it has been verified that replacing all the zinc by manganese in the manganese-zinc ferrites of FIGURE 9 causes no significant change in the location of the lower limit. It has also been verified that replacing all the nickel by zinc in the nickel-zinc ferrites of FIGURE 9 makes no significant change in their phase behavior. Most ferrites resemble nickel ferrite in their phase behavior in that the lower boundary moves to relatively high values of percent oxygen for starting compositions containing less than 50 mol percent $Fe_2O_3$. Manganese ferrite is the important exception since the lower boundary moves to relatively high values for starting compositions containing less than 40 mol percent $Fe_2O_3$. These boundaries are thus seen to have general applicability. Their usefulness is further extended by interpolation between appropriate pairs of boundaries. A convenient way to do this is as follows: Locate the points of intersection of the two boundaries with the 1400° C. coordinate line. Use linear interpolation with respect to $Fe_2O_3$ content between these two points to establish the location of the intersection of the desired lower boundary line with the 1400° C. coordinate line. Use a similar procedure to locate the point of intersection of the desired boundary line with the 900° C. coordinate line. A line joining the two interpolated intersection points is the desired lower phase boundary.

The upper phase boundary for magnetite, and several manganese-zinc ferrite compositions are shown in FIGURE 10. Magnetite is again the lowest. The upper phase boundaries for manganese-zinc ferrites and nickel-zinc ferrites of the same $Fe_2O_3$ content practically coincide for $Fe_2O_3$ content between 52 mol percent and 100 mol percent $Fe_2O_3$. At 50 mol percent $Fe_2O_3$ the upper phase boundary for nickel-zinc ferrites are not observed because they occur at too high percent (i.e. too high pressure) of oxygen. Similarly the upper phase boundary for manganese-zinc ferrites is not observed for $Fe_2O_3$ content 40 mol percent and less. The general remark about application to other compositions which were made in connection with applicability and interpolation of the lower phase boundary also apply to the upper phase boundary.

Having established the general location of the upper and lower phase boundaries for any particular ferrite composition under consideration by interpolation from the existing data relating to certain known important ferrite compositions presented in FIGURES 9 and 10, as described in the above-identified manner, the predicted position of these upper and lower phase boundary limits may then be verified should it be desired. Verification of the positions of the upper and lower phase boundary limits for a ferrite composition under consideration can be obtained by empirical methods of preparing samples and firing such samples at temperatures above and below the predicted phase boundary lines, and subsequently examining such samples under a microscope. Those samples which are 100% spinel in structure, of course lie on the proper side of the phase boundary line being verified, and this fact can be established by the appearance of the ferrite sample under microscopic examination. Prior to microscopic examination, it is necessary to prepare each of the samples to be examined by conventional microscopic techniques such as those described in Microscopy of Ceramics and Cements—H. Insley and V. D. Frechette—Academic Press, Inc., New York—1955. In the event that the ferrite sample is 100% spinel in character, its appearance under the microscope is such that it has a characteristic homogeneity of color that may be readily identified. This characteristic homogeneity of color is apparently common to all ferrite compositions which are 100% spinel in character. In the event that the ferrite sample has been fired at a point below the lower phase boundary, the prepared sample of such a ferrite under microscopic examination will be heterogeneous in appearance, having areas of lighter and darker color than the color of 100% spinel ferrite samples.

In such event, the sample will appear to include many small, pointed irregularities darker in color than the spinel occurring throughout the surface of the polished sample. These irregularities occur at grain boundaries of the ferrite, and are brought about by reason of the ferrite sample being fired in a too reducing atmosphere. At this point, care should be exercised to insure that one is not observing small pits that may be in the surface of the polished sample under examination, for such pits may occur in a 100% spinel structure due to the fact that it is impossible to polish such samples in a manner to avoid the occurrence of all such pits. To avoid any error due to the occurrence of pits, an off-color spot which is suspected to be a pit, can be examined by refocusing the microscope on the supposed bottom of the pit to establish the fact that the spot in question is indeed a pit. After one has become more familiar with the appearance of polished surface ferrite samples, the difference between pitted areas, and inhomogeneities due to a too reducing firing atmosphere, may be readily identified.

With regard to samples of the ferrite composition which have been fired under conditions which would place it above the upper phase boundary, these samples likewise take on an imhomogeneous appearance, and will include minute linear irregularities lighter in color than the spinel which tend to run parallel to one another. This structure is known as Widman statten structure. This characteristic appearance will also become familiar to an observer after a sufficient number of samples exhibiting such an appearance have been examined. It should be noted that, depending upon the procedure followed in reaching the sintering temperature of a particular ferrite sample in question, the imhomogeneities occurring in the sample, due to either a too-reducing condition because the sample has been fired below the lower spinel boundary, or because the sample has been fired under conditions which are over-oxidizing at a point above the upper spinel phase boundary, may have the characteristic appearances identified above, or it may be entirely irregular in appearance. In this last event, extreme care must be exercised to distinguish such irregular characteristic imhomogeneities from the normally occurring pits which appear in almost all polished ferrite samples whether they be 100% spinel in character or not.

Having established the upper and lower spinel phase boundary limits for the ferrite composition under consideration, we have established what portion of FIGURE 5 can be used for the preparation of this ferrite. (See Para. 1 of this section.) It then becomes quite easy to determine the slope of one of the equilibrium atmosphere lines to be used in the subsequent cooling operation of the particular ferrite composition in question for the slope of the selected equilibrium atmosphere line can be approximated from the slope of the lower phase boundary of the spinel area for that ferrite composition. As stated before, this rather ready means of establishing the slope of the equilibrium atmosphere line to be used with any given ferrite composition is made available by reason of the observation that for all known ferrite compositions, the lower spinel phase boundary line lies substantially parallel to the constant composition equilibrium atmosphere lines lying within the spinel area defined by that lower phase boundary.

At this point, it is necessary to determine at what peak sintering temperature, and corresponding oxygen atmosphere the particular ferrite composition in question should be fired in order to come up with a material having the magnetic characteristics which would make it particularly suitable for use in the application for which it is being tailored. To establish this information, it is necessary to prepare a number of samples which are fired to a number of different peak sintering temperatures in predetermined oxygen atmospheres with the samples being subsequently cooled along appropriate equilibrium atmosphere lines interpolated from FIGURE 5, all of this being done in a manner to be described more fully hereinafter with reference to the application of the universal equilibrium atmosphere diagram to several important known ferrites.

TABLE II.—PART 1

[Magnetic flux densities at three values of applied field for six MnZnFe ferrites fired at five different sintering temperatures, and cooled under equilibrium atmosphere conditions]

| Temperatures, °C | 1,225 | 1,313 | 1,368 | 1,410 | 1,465 |
|---|---|---|---|---|---|
| Applied Field H (in oersted) | 10-1-½ | 10-1-½ | 10-1-½ | 10-1-½ | 10-1-½ |

100% Oxygen Content

| Comp. No.: | | | | | |
|---|---|---|---|---|---|
| 750 | | 4,010 | 4,160 | 4,140 | 4,140 |
|     | | 3,460 | 3,430 | 3,470 | 3,130 |
|     | | 3,130 | 3,070 | 3,050 | 2,990 |
| 751 | | 4,130 | 4,470 | 4,690 | 4,540 |
|     | | 3,380 | 3,400 | 3,370 | 3,160 |
|     | | 2,630 | 2,580 | 2,310 | 2,230 |
| 752 | | 4,420 | 4,530 | 4,710 | 4,740 |
|     | | 3,430 | 3,460 | 3,040 | 3,080 |
|     | | 2,320 | 2,510 | 2,060 | 2,140 |
| 753 | | 4,420 | 4,670 | 4,790 | 4,560 |
|     | | 3,290 | 3,610 | 3,000 | 3,000 |
|     | | 2,120 | 2,490 | 2,040 | 2,150 |
| 754 | | 4,770 | 4,950 | 4,990 | 4,810 |
|     | | 3,550 | 3,510 | 2,870 | 2,890 |
|     | | 2,250 | 2,470 | 2,000 | 2,170 |
| 755 | | 4,870 | 4,860 | 4,880 | 4,780 |
|     | | 3,330 | 3,240 | 2,570 | 2,820 |
|     | | 1,880 | 1,960 | 1,860 | 2,080 |

4% Oxygen Content

| Comp. No.: | | | | | |
|---|---|---|---|---|---|
| 750 | 3,930 | 4,140 | 4,030 | 4,180 | |
|     | 3,000 | 3,300 | 2,820 | 3,240 | |
|     | 1,600 | 2,430 | 2,180 | 2,740 | |
| 751 | 4,490 | 4,490 | 4,460 | 4,400 | |
|     | 2,900 | 3,240 | 3,110 | 3,020 | |
|     | 1,390 | 2,070 | 2,210 | 2,260 | |
| 752 | 4,420 | 4,640 | 4,590 | 4,490 | |
|     | 2,750 | 3,175 | 3,190 | 3,080 | |
|     | 1,310 | 1,770 | 2,270 | 2,340 | |
| 753 | 4,340 | 3,730 | 4,840 | 4,600 | |
|     | 2,550 | 3,050 | 3,350 | 3,130 | |
|     | 1,260 | 1,690 | 2,280 | 2,350 | |
| 754 | 4,960 | 3,900 | 4,750 | 4,690 | |
|     | 2,850 | 2,900 | 2,930 | 3,040 | |
|     | 1,510 | 1,830 | 2,020 | 1,480 | |
| 755 | 4,500 | 4,680 | 3,740 | 4,680 | |
|     | 2,720 | 2,790 | 2,800 | 3,070 | |
|     | 1,130 | 1,490 | 1,700 | 2,260 | |

TABLE II.—PART 2

| Temperatures, °C | 1,225 | 1,313 | 1,368 | 1,410 | 1,465 |
|---|---|---|---|---|---|
| Applied Field H (in oersted) | 10-1-½ | 10-1-½ | 10-1-½ | 10-1-½ | 10-1-½ |

0.2% Oxygen Content

| Comp. No.: | | | | | |
|---|---|---|---|---|---|
| 750 | | 4,000 | 4,100 | 3,970 | 4,000 |
|     | | 3,130 | 3,180 | 3,060 | 2,905 |
|     | | 2,420 | 2,660 | 2,720 | 2,410 |
| 751 | | 4,430 | 4,350 | 4,320 | 4,320 |
|     | | 3,090 | 2,980 | 3,060 | 2,850 |
|     | | 1,870 | 2,320 | 2,440 | 2,160 |
| 752 | | 4,520 | 3,990 | 4,450 | 4,420 |
|     | | 3,350 | 2,810 | 3,100 | 2,860 |
|     | | 1,940 | 2,080 | 2,460 | 2,230 |
| 753 | | 4,450 | 4,440 | 4,460 | 4,400 |
|     | | 2,960 | 2,900 | 3,040 | 2,870 |
|     | | 1,800 | 2,200 | 2,410 | 2,200 |
| 754 | | 4,670 | 4,690 | 4,600 | 4,140 |
|     | | 2,990 | 2,880 | 2,970 | 2,790 |
|     | | 1,870 | 2,030 | 2,170 | 2,030 |
| 755 | | 4,620 | 4,650 | 4,460 | 4,350 |
|     | | 2,980 | 2,830 | 2,800 | 2,730 |
|     | | 1,462 | 1,820 | 2,000 | 1,760 |

0.01 Oxygen Content

| Comp. No.: | | | | | |
|---|---|---|---|---|---|
| 750 | 3,970 | 4,080 | 4,130 | 3,160 | |
|     | 2,640 | 2,840 | 3,060 | 1,510 | |
|     | 1,810 | 2,110 | 2,480 | 600 | |
| 751 | 4,780 | 4,370 | 3,640 | | |
|     | 2,540 | 2,780 | 1,790 | | |
|     | 1,690 | 2,100 | 700 | | |
| 752 | 4,410 | 4,550 | 3,760 | | |
|     | 2,500 | 2,900 | 1,850 | | |
|     | 1,830 | 2,220 | 920 | | |
| 753 | 4,210 | 4,530 | 4,600 | 4,610 | |
|     | 1,600 | 2,580 | 2,920 | 2,520 | |
|     | 550 | 1,850 | 2,270 | 1,780 | |
| 754 | 4,290 | 4,700 | 4,670 | 4,540 | |
|     | 1,620 | 2,680 | 2,730 | 2,540 | |
|     | 610 | 1,680 | 1,850 | 1,710 | |
| 755 | 4,120 | 4,500 | 4,650 | 4,610 | |
|     | 1,220 | 2,160 | 2,800 | 2,480 | |
|     | 470 | 849 | 1,720 | 1,560 | |

*Application of Universal Equilibrium Atmosphere Diagram to Manganese-Zinc-Iron Ferrites*

Table II, Parts 1 and 2, contains the results obtained from the evaluation of six MnZnFe ferrites having the following initial compositions:

TABLE II.—PART 3

| Composition No. | $Fe_2O_3$, mol percent | ZnO, mol percent | $MnO_2$, mol percent |
|---|---|---|---|
| 750 | 50 | 17.8 | 32.2 |
| 751 | 51 | 17.4 | 31.6 |
| 752 | 52 | 17.0 | 31.0 |
| 753 | 53 | 16.7 | 30.3 |
| 754 | 54 | 16.3 | 29.7 |
| 755 | 55 | 16.0 | 29.0 |

The temperatures and oxygen percentages shown are those used at the peak of the sintering treatment, and are indicated by their position in the table. The samples were cooled in equilibrium atmospheres interpolated from FIGURE 5 by drawing a line through a position on FIGURE 5 which corresponds to the sintering temperature and oxygen percentage of the atmosphere used at the peak sintering temperature. The slope of the line thus drawn can be best approximated from adjacent existing curves already plotted on FIGURE 5. The magnetic flux densities at applied field strengths of ½, 1, and 10 oersteds are the properties being tabulated, and these measurements were obtained by means of a ballistic galvanometer after the ferrite samples had been processed in the manner prescribed. The object of this evaluation was to find the best peak sintering treatment (i.e. peak sintering temperature and oxygen content in the atmosphere) which yields a ferirte having the highest flux densities under a coercive field of one oersted.

Examination of the values obtained in Table II shows that a very large majority of the samples identified in Table V have excellent properties. Prior to the development of the equilibrium atmosphere methods herein described, ferrites having flux densities of 2200 gauss at one oersted were about the best that could be obtained with these known compositions. Now only a few samples fall to that value in spite of rather wide variations in both peak sintering temperature and percent oxygen at the peak sintering temperature. In this respect, the equilibrium atmosphere methods might be said to have achieved a fairly non-critical procedure for making these compositions yield fluxes close to 300 gauss at one oersted. Thus, the overall level of quality of these ferrites has been almost doubled. One would expect then, that if the equilibrium atmosphere methods are applied critically, some exceptional results ought to be obtainable.

The general features of the "best" ferrite can be seen in Table II. The highest values of flux at one oersted are obtained in the samples sintered in oxygen, and among these samples there is ample evidence that the sintering temperature should not exceed 1410° C. (2570° F.) There is a pattern too among the compositions. Examination of the flux density values at 10 oersteds shows that in the neighborhood of composition 754 there is a maximum flux density value. This is important in that the 10 oersted value can be taken as an optimistic upper limit of the value that is likely to be achieved at one oersted by any treatment of the composition. A composition near 754 was examined with this point of view in mind. Some selected values including the best obtained from the samples cited are shown in FIGURE 6. Here the entire magnetization curves as obtained from a ballistic galvanometer are shown. The actual temperature versus percent oxygen lines used to produce each of the samples is shown in FIGURE 7. Paths D and G of FIGURE 7 are truly equilibrium atmosphere lines. It appeared from much of the data that better results could be obtained if higher temperatures and higher pressures of oxygen could be used. These were not readily achievable so non-equilibrium atmosphere lines were tried which would permit only a small and slow transfer of oxygen to the ferrite. Paths A, B, and C are examples of these. It is not possible to preserve a 100% spinel structure if paths A, B, and C are followed across the upper boundary of the spinel area; hence, it is advisable to depart from paths B and C at about 1000° C. When this temperature is reached the beneficial effects of following paths A, B, and C are greatly reduced, while on the other hand, the penalty for crossing the spinel boundary is large. What path should be followed after B and C must be abandoned? A jump to path G is very practical; however, the choice is not too critical. A jump to a constant atmosphere of $10^{-5}\%$ $O_2$ is equally workable. Excellent results were obtained from both paths B and C with jumps being made in either of the manners identified above. Samples made along path A were not as good as B and C even through the 100% spinel structure was maintained.

Other alternate paths suggest themselves, and are successful in the extent to which they approach the best path. One such alternate path, for example, would be to cool in 100% oxygen to 1250° C., followed by a change to 20% $O_2$ down to 1150° C., followed by a change to $CO_2$ gas down to 900° C., followed by a change to a $CO_2$ and CO mixture in the ratio $CO_2:CO=1000:1$ down to room temperature. This zig-zag path fairly averages out to path B, and it gives good results but not as good as path B.

Two other non-equilibrium atmosphere lines are illustrated in FIGURES 6 and 7. As can determined from an examination of FIGURE 7, path H has the following properties: It uses just one value of percent oxygen, 0.25%, and it crosses path B at the upper limit of the spinel area. For the latter reason, path H must be abandoned at about 1000° C. for the same reasons that paths A, B, and C must be abandoned at about the same temperature. Path H was evaluated, however, because it is one of a number of possible constant gas mixtures that could be used in this way, but the results are inferior to those obtained by following closer approximations to equilibrium atmosphere lines.

A somewhat more attractive off-equilibrium atmosphere path is path J which is the path followed by using $CO_2$ gas. This path is a nearer approach to an equilibrium atmosphere line than is path H which is probably due to the dissociation characteristics of $CO_2$. Following path J gives somewhat inferior results to those obtained by following equilibrium atmosphere paths.

From a consideration of the above, it can be appreciated that the treatment requirements for achieving high flux densities at one oersted reduce to this:

(1) The oxygen content of the ferrite should be kept near the upper limit.

(2) The atmosphere should be arranged to hold the exchange of oxygen between ferrite and atmosphere to a minimum during sintering and cooling.

(3) The sintering temperature should be as high as is compatible with the first two requirements. The significant improvements achieved by the compromises in these three requirements in paths B and C above point out the desirability of using high pressures of oxygen, and emphasize the importance of the extra-polated portion of FIGURE 5.

The discussion of the equilibrium atmosphere methods above has been directed toward the optimizing of magnetic flux at one oersted at frequencies up to about 50 kc. If some other magnetic property or performance in some other frequency range was being optimized other conclusions may be expected. This is illustrated in the application of the equilibrium atmosphere methods to several nickel, zinc, iron ferrites.

TABLE III.—PART I—SECTION A

[Magnetic flux densities at 50 kc. and 1000 kc. at 0.7 oersted and 1.4 oersteds applied field for four different NiZnFe ferrites fired at seven different sintering temperatures and cooled under equilibrium atmosphere conditions]

| Temp., °C | 1,205 | | | | 1,260 | | | | 1,315 | | | | 1,370 | | | |
|---|---|---|---|---|---|---|---|---|---|---|---|---|---|---|---|---|
| Freq., kc | 50 | | 1,000 | | 50 | | 1,000 | | 50 | | 1,000 | | 50 | | 1,000 | |
| Field H | 1.4 | 0.7 | 1.4 | 0.7 | 1.4 | 0.7 | 1.4 | 0.7 | 1.4 | 0.7 | 1.4 | 0.7 | 1.4 | 0.7 | 1.4 | 0.7 |

100% Oxygen Content

| Comp. No. | | | | | | | | | | | | | | | | |
|---|---|---|---|---|---|---|---|---|---|---|---|---|---|---|---|---|
| 704 | | | | | 420 | | | | 1,110 | | | | 2,525 | | | |
| | | | | | | 155 | | | | 150 | | | | 145 | | |
| | | | | | | | 350 | | | | 140 | | | | 545 | |
| | | | | | | | | 120 | | | | 105 | | | | 115 |
| 737 | | | | | 450 | | | | 1,875 | | | | 2,840 | | | |
| | | | | | | 155 | | | | 120 | | | | 145 | | |
| | | | | | | | 360 | | | | 305 | | | | 370 | |
| | | | | | | | | 110 | | | | 110 | | | | 90 |
| 730 | | | | | 460 | | | | 940 | | | | 2,290 | | | |
| | | | | | | 160 | | | | 160 | | | | 125 | | |
| | | | | | | | 400 | | | | 330 | | | | 845 | |
| | | | | | | | | 130 | | | | 95 | | | | 120 |
| 731 | | | | | 370 | | | | 975 | | | | 3,010 | | | |
| | | | | | | 155 | | | | 225 | | | | 2,215 | | |
| | | | | | | | 410 | | | | 735 | | | | 770 | |
| | | | | | | | | 140 | | | | 190 | | | | 210 |

4% Oxygen Content

| Comp. No. | | | | | | | | | | | | | | | | |
|---|---|---|---|---|---|---|---|---|---|---|---|---|---|---|---|---|
| 704 | | | | | 380 | | | | 780 | | | | 3,310 | | | |
| | | | | | | 130 | | | | 165 | | | | 2,285 | | |
| | | | | | | | | | | | 800 | | | | 940 | |
| | | | | | | | | | | | 140 | | | | | 310 |
| 737 | | | | | 430 | | | | 1,055 | | | | 2,920 | | | |
| | | | | | | 160 | | | | 165 | | | | 1,510 | | |
| | | | | | | | 370 | | | | 510 | | | | 1,080 | |
| | | | | | | | | 120 | | | | 125 | | | | 250 |
| 730 | | | | | 400 | | | | 2,005 | | | | 3,130 | | | |
| | | | | | | 140 | | | | 190 | | | | 1,815 | | |
| | | | | | | | 310 | | | | 475 | | | | 750 | |
| | | | | | | | | 110 | | | | 90 | | | | 225 |
| 731 | | | | | 480 | | | | 3,015 | | | | 2,065 | | | |
| | | | | | | 185 | | | | 2,155 | | | | 965 | | |
| | | | | | | | 365 | | | | 880 | | | | 920 | |
| | | | | | | | | 115 | | | | 210 | | | | 380 |

TABLE III.—PART 1—SECTION B

[Magnetic flux densities at 50 kc. and 1000 kc. at 0.7 oersted and 1.4 oersteds applied field for four different NiZnFe ferrites fired at seven different sintering temperatures and cooled under equilibrium atmosphere conditions]

| Temp., °C | 1,425 | | | | 1,480 | | | | 1,535 | | | |
|---|---|---|---|---|---|---|---|---|---|---|---|---|
| Freq., kc | 50 | | 1,000 | | 50 | | 1,000 | | 50 | | 1,000 | |
| Field H | 1.4 | 0.7 | 1.4 | 0.7 | 1.4 | 0.7 | 1.4 | 0.7 | 1.4 | 0.7 | 1.4 | 0.7 |
| 100% Oxygen Content | | | | | | | | | | | | |
| Comp. No.: | | | | | | | | | | | | |
| 704 | 3,230 | | | | 3,745 | | | | 3,645 | | | |
|  |  | 215 |  |  |  | 3,100 |  |  |  | 2,645 |  |  |
|  |  |  | 525 |  |  |  | 760 |  |  |  | 1,000 |  |
|  |  |  |  | 185 |  |  |  | 150 |  |  |  | 275 |
| 737 | 3,290 | | | | 3,540 | | | | 2,710 | | | |
|  |  | 1,695 |  |  |  | 2,950 |  |  |  | 1,830 |  |  |
|  |  |  | 780 |  |  |  | 780 |  |  |  | 790 |  |
|  |  |  |  | 120 |  |  |  | 200 |  |  |  | 315 |
| 730 | 3,005 | | | | 3,480 | | | | 3,130 | | | |
|  |  | 925 |  |  |  | 2,730 |  |  |  | 2,675 |  |  |
|  |  |  | 1,000 |  |  |  | 800 |  |  |  | 690 |  |
|  |  |  |  | 220 |  |  |  | 160 |  |  |  | 195 |
| 731 | 3,095 | | | | 2,895 | | | | 3,640 | | | |
|  |  | 2,335 |  |  |  | 2,440 |  |  |  | 2,855 |  |  |
|  |  |  | 790 |  |  |  | 600 |  |  |  | 820 |  |
|  |  |  |  | 180 |  |  |  | 140 |  |  |  | 265 |
| 4% Oxygen Content | | | | | | | | | | | | |
| Comp. No.: | | | | | | | | | | | | |
| 704 | 3,495 | | | | 3,180 | | | | | | | |
|  |  | 2,500 |  |  |  | 2,115 |  |  |  |  |  |  |
|  |  |  | 1,020 |  |  |  | 880 |  |  |  |  |  |
|  |  |  |  | 265 |  |  |  | 340 |  |  | 825 |  |
| 737 | 3,025 | | | | 2,885 | | | | | | | |
|  |  | 1,550 |  |  |  | 1,655 |  |  |  |  |  | 295 |
|  |  |  | 980 |  |  |  | 915 |  |  |  | 580 |  |
|  |  |  |  | 230 |  |  |  | 350 |  |  |  | 220 |
| 730 | 3,400 | | | | 2,865 | | | | | | 815 | |
|  |  | 2,245 |  |  |  | 1,420 |  |  |  |  |  | 295 |
|  |  |  | 660 |  |  |  | 1,060 |  |  |  | 500 |  |
|  |  |  |  | 180 |  |  |  | 420 |  |  |  | 190 |
| 731 | 2,490 | | | | 2,035 | | | | 630 | | | |
|  |  | 1,500 |  |  |  | 875 |  |  |  |  | 200 |  |
|  |  |  | 1,050 |  |  |  | 955 |  |  |  | 380 |  |
|  |  |  |  | 340 |  |  |  | 340 |  |  |  | 160 |

TABLE III.—PART 2—SECTION A

[Magnetic flux densities at 50 kc. and 1000 kc. at 0.7 oersted and 1.4 oersteds applied field for four different NiZnFe ferrities fired at seven different sintering temperatures and cooled under equilibrium atmosphere conditions]

| Temp., °C | 1,205 | | | | 1,260 | | | | 1,315 | | | | 1,370 | | | |
|---|---|---|---|---|---|---|---|---|---|---|---|---|---|---|---|---|
| Freq., kc | 50 | | 1,000 | | 50 | | 1,000 | | 50 | | 1,000 | | 50 | | 1,000 | |
| Field H | 1.4 | 0.7 | 1.4 | 0.7 | 1.4 | 0.7 | 1.4 | 0.7 | 1.4 | 0.7 | 1.4 | 0.7 | 1.4 | 0.7 | 1.4 | 0.7 |
| 0.2% Oxygen Content | | | | | | | | | | | | | | | | |
| Comp. No.: | | | | | | | | | | | | | | | | |
| 704 | 295 | | | | 690 | | | | 2,110 | | | | 3,115 | | | |
|  |  | 130 |  |  |  | 170 |  |  |  | 300 |  |  |  | 1,660 |  |  |
|  |  |  | 240 |  |  |  | 595 |  |  |  | 1,050 |  |  |  | 990 |  |
|  |  |  |  | 95 |  |  |  | 145 |  |  |  | 205 |  |  |  | 360 |
| 737 | 315 | | | | 895 | | | | 1,325 | | | | 3,135 | | | |
|  |  | 135 |  |  |  | 180 |  |  |  | 185 |  |  |  | 1,560 |  |  |
|  |  |  | 195 |  |  |  | 675 |  |  |  | 890 |  |  |  | 1,050 |  |
|  |  |  |  | 75 |  |  |  | 160 |  |  |  | 170 |  |  |  | 240 |
| 730 | 280 | | | | 2,975 | | | | 2,725 | | | | 2,975 | | | |
|  |  | 115 |  |  |  | 700 |  |  |  | 1,380 |  |  |  | 560 |  |  |
|  |  |  | 160 |  |  |  | 810 |  |  |  | 680 |  |  |  | 1,200 |  |
|  |  |  |  | 70 |  |  |  | 175 |  |  |  | 140 |  |  |  | 260 |
| 731 | 1,195 | | | | 2,760 | | | | 2,610 | | | | 1,695 | | | |
|  |  | 160 |  |  |  | 320 |  |  |  | 1,050 |  |  |  | 485 |  |  |
|  |  |  | 700 |  |  |  | 890 |  |  |  | 1,120 |  |  |  | 960 |  |
|  |  |  |  | 150 |  |  |  | 220 |  |  |  | 420 |  |  |  | 350 |
| 0.01% Oxygen Content | | | | | | | | | | | | | | | | |
| Comp. No.: | | | | | | | | | | | | | | | | |
| 704 | 210 | | | | 505 | | | | 3,075 | | | | 3,115 | | | |
|  |  | 95 |  |  |  | 170 |  |  |  | 1,445 |  |  |  | 1,890 |  |  |
|  |  |  | 150 |  |  |  | 420 |  |  |  | 980 |  |  |  | 950 |  |
|  |  |  |  | 65 |  |  |  | 120 |  |  |  | 305 |  |  |  | 310 |
| 737 | 355 | | | | 500 | | | | 2,720 | | | | 3,010 | | | |
|  |  | 125 |  |  |  | 175 |  |  |  | 680 |  |  |  | 1,950 |  |  |
|  |  |  | 225 |  |  |  | 550 |  |  |  | 1,180 |  |  |  | 940 |  |
|  |  |  |  | 90 |  |  |  | 125 |  |  |  | 310 |  |  |  | 310 |
| 730 | 255 | | | | 570 | | | | 2,920 | | | | 2,925 | | | |
|  |  | 105 |  |  |  | 160 |  |  |  | 1,320 |  |  |  | 1,740 |  |  |
|  |  |  | 145 |  |  |  | 400 |  |  |  | 1,000 |  |  |  | 825 |  |
|  |  |  |  | 60 |  |  |  | 115 |  |  |  | 305 |  |  |  | 260 |
| 731 | 445 | | | | 2,105 | | | | 1,755 | | | | 1,650 | | | |
|  |  | 185 |  |  |  | 245 |  |  |  | 420 |  |  |  | 515 |  |  |
|  |  |  | 460 |  |  |  | 895 |  |  |  | 890 |  |  |  | 920 |  |
|  |  |  |  | 135 |  |  |  | 255 |  |  |  | 320 |  |  |  | 380 |

TABLE III.—PART 2—SECTION B

[Magnetic flux densities at 50 kc. and 1000 kc. at 0.7 oersted and 1.4 oersteds applied field for four different NiZnFe ferrites fired at seven different sintering temperatures and cooled under equilibrium atmosphere conditions]

| Temp., °C | 1,425 | | | | 1,480 | | | | 1,535 | | | |
|---|---|---|---|---|---|---|---|---|---|---|---|---|
| Freq., kc | 50 | | 1,000 | | 50 | | 1,000 | | 50 | | 1,000 | |
| Field H | 1.4 | 0.7 | 1.4 | 0.7 | 1.4 | 0.7 | 1.4 | 0.7 | 1.4 | 0.7 | 1.4 | 0.7 |
| 0.2% Oxygen Content | | | | | | | | | | | | |
| Comp. No.: 704 | 3,110 | | | | 1,650 | | | | | | | |
|  |  | 1,670 | | | | 590 | | | | | | |
|  |  |  | 1,050 | | | | 720 | | | | | |
|  |  |  |  | 380 | | | | 300 | | | | |
| 737 | 490 | | | | 1,515 | | | | | | | |
|  |  | 180 | | | | 570 | | | | | | |
|  |  |  | 380 | | | | 810 | | | | | |
|  |  |  |  | 140 | | | | 270 | | | | |
| 730 | 1,970 | | | | 1,450 | | | | | | | |
|  |  | 680 | | | | 590 | | | | | | |
|  |  |  | 830 | | | | 720 | | | | | |
|  |  |  |  | 250 | | | | 260 | | | | |
| 731 | 500 | | | | 1,450 | | | | | | | |
|  |  | 180 | | | | 340 | | | | | | |
|  |  |  | 480 | | | | 540 | | | | | |
|  |  |  |  | 175 | | | | 200 | | | | |
| 0.01% Oxygen Content | | | | | | | | | | | | |
| Comp. No.: 704 | 1,665 | | | | 1,310 | | | | | | | |
|  |  | 445 | | | | 390 | | | | | | |
|  |  |  | 820 | | | | 695 | | | | | |
|  |  |  |  | 305 | | | | 275 | | | | |
| 737 | 1,325 | | | | 1,090 | | | | | | | |
|  |  | 365 | | | | 305 | | | | | | |
|  |  |  | 760 | | | | 685 | | | | | |
|  |  |  |  | 250 | | | | 265 | | | | |
| 730 | 1,400 | | | | 875 | | | | | | | |
|  |  | 220 | | | | 255 | | | | | | |
|  |  |  | 815 | | | | 555 | | | | | |
|  |  |  |  | 290 | | | | 210 | | | | |
| 731 | 1,050 | | | | 640 | | | | | | | |
|  |  | 295 | | | | 190 | | | | | | |
|  |  |  | 715 | | | | 470 | | | | | |
|  |  |  |  | 240 | | | | 190 | | | | |

Application of Universal Equilibrium Atmosphere Diagram to Nickel, Zinc, Iron Ferrites Table III, Parts 1 and 2, contains the results obtained from the evaluation of four nickel, zinc, iron ferrites having the following initial compositions:

TABLE III.—PART 3

| Composition No. | $Fe_2O_3$, mol percent | ZnO, mol percent | NiO, mol percent |
|---|---|---|---|
| 704 | 54.6 | 18.2 | 27.2 |
| 737 | 53.6 | 18.5 | 27.9 |
| 730 | 52.7 | 18.9 | 28.4 |
| 731 | 51.2 | 19.5 | 29.3 |

The temperatures and oxygen percentages used at the peak of the sintering treatment are indicated by their position in the table. The samples were cooled in equilibrium atmospheres interpolated from FIGURE 5 in the manner described earlier with respect to manganese, zinc, iron ferrite samples. The magnetic flux densities at applied field strengths of 0.7 and 1.4 oersteds at the two frequencies of 50 kc. and 1000 kc. are the properties tabulated. The object of this evaluation was to find the treatment which yields the highest flux densities under these four conditions.

As can be determined from Table III, the "best" treatment for these ferrites depend upon the electrical frequency at which the ferrite is to be used. For 50 kc. and the lower frequencies, sintering at a temperature near 1480° C. (2700° F.) in a 100% oxygen atmosphere (oxygen at one atmosphere pressure) followed by cooling in an equilibrium atmosphere gives excellent results. It should be noted that treatment in this manner resulted in ferrites having relatively large grains in their grain structure. This fact, and from the way the flux density values increase with increasing oxygen content, makes it appear that even better ferrites would be obtained at 1535° C. (2800° F.) if higher oxygen pressures, such as 20 atmospheres pressure, were used.

For ferrites to be used at 1000 kc. the most consistent results are obtained at lower sintering temperatures 1315° C. (2400° F.)–1370° C. (2500° F.) and in lower percentages of oxygen during sintering. These samples always have small grains in their grain structures. It is seen also that occasionally good samples are made at higher temperatures and higher oxygen percentages. These "occasional" samples resemble the low temperature low oxygen percentage samples in that their grain sizes are small, and for some unknown reason, their grains did not grow to the sizes normally achieved under the sintering conditions employed.

In these two different "best" treatments (one for ferrites for low frequency applications, and the other for higher frequency applications), an important advantage is seen for the use of the equilibrium atmosphere information contained herein for making ferrites in which the choice of oxygen content in the ferrite can be made independent of the choice of grain size.

It has been demonstrated that small grain size is needed for best properties at a frequency of 1000 kc. Small grains are best obtained by limiting the sintering temperature, and if one were constrained to always use the same percentage oxygen, such as the percentage oxygen found in air, for sintering, one would be limited to the oxygen content in the ferrite which would result from sintering in that atmosphere. On the other hand, if the percentage oxygen may be chosen which gives the best oxygen content in the ferrite at the best sintering temperature, and if this best oxygen content in the ferrite is preserved by using an appropriate equilibrium atmosphere during cooling, then excellent and reproducible results can be obtained by reason of the methods described herein, this goal has been achieved.

It will be noticed that the values of percent oxygen used in Table IV do not extend to as low values as were used in previous tables. This is the case because the lower boundary of the spinel area for these ferrites

TABLE IV

[Applied field, squareness ratio, and magnetic flux density all at maximum squareness for four MnMg ferrites fired at four different sintering temperatures, and cooled under equilibrium atmosphere conditions]

| No. | 1,315° C. (2,400° F.) | | | 1,343° C. (2,450° F.) | | | 1,370° C. (2,500° F.) | | | 1,398° C. (2,550° F.) | | |
|---|---|---|---|---|---|---|---|---|---|---|---|---|
| | H | R | B | H | R | B | H | R | B | H | R | B |
| 100% Oxygen ||||||||||||| 
| 8 | 2.75 | .616 | 839 | 1.50 | .782 | 922 | 1.25 | .850 | 1,123 | 1.25 | .850 | 865 |
| 70 | 2.75 | .660 | 900 | 2.00 | .796 | 1,375 | 1.50 | .867 | 1,317 | 1.25 | .835 | 818 |
| 6 | 2.85 | .716 | 912 | 1.50 | .816 | 1,158 | 1.50 | .850 | 1,462 | 1.00 | .800 | 664 |
| 12 | 2.25 | .716 | 1,018 | 1.75 | .750 | 1,388 | 1.50 | .832 | 1,460 | 1.25 | .835 | 928 |
| 20% Oxygen ||||||||||||| 
| 8 | 2.75 | .700 | 1,218 | 2.25 | .667 | 1,148 | 1.80 | .768 | 1,475 | 1.65 | .768 | 571 |
| 70 | 2.50 | .722 | 1,327 | 2.25 | .800 | 1,531 | 1.80 | .735 | 1,323 | 1.50 | .700 | 1,128 |
| 6 | 2.25 | .700 | 1,265 | 2.10 | .632 | 1,128 | 1.50 | .685 | 1,230 | 1.40 | .683 | 712 |
| 12 | 2.25 | .750 | 1,092 | 2.00 | .800 | 1,470 | 1.70 | .668 | 1,320 | 1.50 | .784 | 1,038 |
| 4% Oxygen ||||||||||||| 
| 8 | 2.75 | .722 | 2,040 | 2.00 | .750 | 1,268 | 1.75 | .767 | 1,150 | 1.25 | .840 | 536 |
| 70 | 2.50 | .732 | 1,243 | 1.75 | .773 | 1,172 | 1.50 | .832 | 1,460 | 1.25 | .700 | 619 |
| 6 | 1.90 | .758 | 1,275 | 1.75 | .766 | 1,113 | 1.50 | .832 | 1,302 | 1.25 | .770 | 756 |
| 12 | 2.25 | .783 | 1,308 | 1.75 | .816 | 1,295 | 1.50 | .850 | 1,395 | 1.25 | .720 | 777 |
| 0.8% Oxygen ||||||||||||| 
| 8 | 2.25 | .783 | 1,363 | 1.87 | .783 | 1,330 | 1.75 | .712 | 1,243 | 1.65 | .600 | 911 |
| 70 | 2.25 | .705 | 1,273 | 2.00 | .750 | 1,330 | 1.80 | .660 | 1,278 | 1.75 | .650 | 1,293 |
| 6 | 1.75 | .80 | 1,223 | 1.75 | .800 | 1,375 | 1.50 | .730 | 1,058 | 1.40 | .615 | 1,020 |
| 12 | 2.00 | .80 | 1,567 | 1.75 | .833 | 1,532 | 1.50 | .700 | 1,335 | 1.50 | .483 | 1,088 |

*Application of Universal Equilibrium Atmosphere Diagram to Magnesium Manganese Ferrites (Square Loop Ferrites)*

Table IV contains the results obtained from the evaluation of four magnesium manganese ferrites having the following initial compositions:

| Composition No. | $Fe_2O_3$, mol percent | MgO, mol percent | MnO, mol percent |
|---|---|---|---|
| 8 | 44 | 41 | 15 |
| 70 | 42 | 40 | 18 |
| 6 | 40 | 38 | 22 |
| 12 | 37.8 | 35.6 | 26.6 |

The temperatures and oxygen percentages used at the peak of the sintering treatment are indicated by their position in the table. The samples were cooled in equilibrium atmospheres interpolated from FIGURE 5, in the manner described earlier with respect to manganese zinc iron ferrite samples. These magnesium manganese ferrites when properly made exhibit hysteresis loops which are approximately rectangular in shape. The so-called "squareness ratio" is a number which describes an important characteristic of these materials, and is defined for the purpose of this disclosure in FIGURE 8. The squareness ratio is a function of the maximum value of the applied magnetic field H in oersteds applied to the sample cyclically in driving it around the hysteresis loop. The H for maximum squareness is an important property of these ferrites. The amount of magnetic flux density B obtained at the H for maximum squareness is another important property of these materials. The applied magnetic field (H) for maximum squareness, the squareness ratio (R), and the magnetic flux density (B), obtained for an applied magnetic field H, are defined in FIGURE 8, and are the properties tabulated in Table IV.

lies at much higher percent oxygen values than the ferrites considered previously. As a consequence, a relatively small spinel area lies below 100% oxygen for these ferrites. The table shows that a large number of the samples evaluated had squareness in excess of 0.75, which is a good value.

These rectangular hysteresis loop ferrites are used in magnetic memory systems. In order that the large assemblies of ferrite cores that make up these systems perform properly, it is necessary that their magnetic properties be as nearly alike as possible. This requirement places severe tolerances on the whole process, and especially the sintering temperature for the cores are extremely small, and consequently are more easily affected by interaction with the surrounding atmospheres across their entire cross sections than many other ferrites. As a result, cooling in an equilibrium atmosphere is very desirable for this ferrite because it brings under control a variable which must be controlled if good reproducibility is to be achieved.

*Application to Retreatment of Previously Fired Ferrites*

If desired, the magnetic properties of previously fired ferrites can be profoundly influenced by subsequent heat treatment to alter the composition of the ferrite (with respect to valence and cation vacancies) without destroying its homogeneity. If the previous firing history of the ferrite is known, it can be reheated slowly from room temperature with the oxygen content of the atmosphere in the furnace being changed according to its associated equilibrium atmosphere line. At the annealing temperature, preferably within 200° centigrade of its sintering temperature, and with the temperature held constant, the oxygen content of the atmosphere is changed slowly to a new value which is in equilibrium with the desired new composition. The ferrite is then allowed to soak in the new atmosphere at the annealing temperature until equilibrium is obtained, and is then cooled to room temperature along the new equilibrium atmosphere line associated with the new composition. If the previous firing history of the ferrite is not known, then the ferrite may be reheated slowly from room temperature in either an atmosphere having an oxygen content which would be in equilibrium with the desired new composition at the peak annealing temperature, or in an atmosphere which is changed according to the appropriate equilibrium atmosphere line to attain such desired new equilibrium atmosphere at the peak annealing temperature. The ferrite is then allowed to soak at the annealing temperature in the new atmosphere until it is in equilibrium with that atmosphere, and is then cooled in accordance with the appropriate new equilibrium atmosphere schedule to room temperature.

*Application to Preparation of Large Single Crystals of Ferrite*

The equilibrium atmosphere lines of FIGURE 5 are the proper cooling schedules for their associated ferrites in the same way that Smiltens' cooling schedule was the proper one for $Fe_3O_4$. These equilibrium atmosphere lines are the critical information needed to grow crystals from the melt and cool them to room temperature successfully. For a suitable technique and apparatus for growing single crystal ferrites for use with the equilibrium atmosphere diagram herein disclosed, reference is made to the above-identified Smiltens article appearing in the Vol. 20 issue of the Journal of Chemical Physics. Other methods of growing large ferrite crystals—the flame fusion method, and the flux method are not so readily susceptible to atmosphere control during preparations. However, the equilibrium atmospheres are useful in subsequent heat treatment for maintaining the homogeneity of the ferrite during a strain-anneal for example as for altering the composition of the crystal (with respect to valence and cation vacancies) without destroying its homogeneity.

If a simple anneal is desired the crystal is heated slowly from room temperature. The oxygen content of the surrounding atmosphere is changed according to its associated equilibrium atmosphere line. At the annealing temperature both temperature and oxygen content of the atmosphere are held constant. During cooling the schedule is just the reverse of the heating cycle.

A similar procedure can be used if it is desired to change the composition (with respect to valence and cation vacancies) of the ferrite crystal. In this case the crystal is heated along its associated equilibrium atmosphere line preferably to a temperature within 200° C. of its melting temperature. Then essentially at constant temperature the oxygen content of the atmosphere can be changed slowly to a new value which is in equilibrium with the desired new composition. The crystal is then cooled along the new equilibrium atmosphere line associated within the new composition.

From the foregoing description it can be appreciated that the invention provides precise and universally applicable data from which the proper firing and cooling schedules for a large number of different ferrite compositions can be readily determined. By reason of this data, it has been possible to develop new and improved methods of manufacturing ferrites having predetermined and superior magnetic properties, and to manufacture such ferrites reproducibly in large quantities. In order to practice these novel methods on a commercial basis a new and improved tunnel kiln has been developed which is described in copending application Serial No. 688,955, now U.S. Patent 2,960,744, filed concurrently herewith, J. Blank, inventor, entitled "Equilibrium Atmosphere Tunnel Kilns for Ferrite Manufacture" and assigned to the General Electric Company. Otherwise, the application of the methods described herein to simple apparatus such as box kilns or tube furnaces, is believed to be obvious.

Obviously, other modifications and variations of the present invention are possible in the light of the above teachings. It is therefore to be understood that changes may be made in the particular embodiments of the invention described which are within the full intended scope of the invention as defined by the appended claims.

What I claim as new, and desire to be secured by Letters Patent, is:

1. A method of making ferrites having desired magnetic characteristics which comprises sintering raw metal oxide materials containing at least two cation species at a sintering temperature and in an atmosphere having an oxygen content appropriate to provide ferrites having the desired magnetic characteristics, and subsequently cooling the ferrites thus formed in an atmosphere wherein the partial pressure of the oxygen is decreased as the temperature falls and is matched to the tendency to oxidation of the constituent cations so as to hold the oxidation of the ferrite in a state of substantial equilibrium, said decrease lying between $-3 \times 10^4$ and $-8.5 \times 10^4$ which is the rate of change of the natural logarithm of the partial pressure of $O_2$ with respect to the reciprocal of the absolute temperature in degrees Kelvin.

2. A method of making ferrites having desired magnetic characteristics which comprises sintering raw metal oxide materials containing at least two cation species at a sintering temperature and in an atmosphere having an oxygen content appropriate to provide ferrites having the desired magnetic characteristics, and subsequently cooling the ferrites to room temperature in equilibrium atmospheres in which the slope of the partial pressure of $O_2$ versus temperature is interpolated from the curves of FIGURE 5 of the drawings.

3. A method of making single crystal ferrites having desired magnetic characteristics which comprises melting raw metal oxide materials containing at least two cation species at a melting temperature and in an atmosphere having an oxygen content appropriate to provide ferrites having the desired magnetic characteristics, and subsequently cooling the ferrites thus formed in an atmosphere wherein the partial pressure of the oxygen is decreased as the temperature falls and is matched to the tendency to oxidation of the constituent cations so as to hold the oxidation of the ferrite in a state of substantial equilibrium, said decrease lying between $-3 \times 10^4$ and $-8.5 \times 10^4$ which is the rate of change of the natural logarithm of the partial pressure of $O_2$ with respect to the reciprocal of the absolute temperature in degrees Kelvin.

4. The method set forth in claim 3 wherein said raw metal oxide materials are heated to melting temperature in an atmosphere wherein the partial pressure of the oxygen is increased as the temperature rises and is matched to the tendency to oxidation of the constituent cations so as to hold the oxidation of the ferrite in a state of substantial equilibrium, said increase lying between $3 \times 10^4$ and $8.5 \times 10^4$ which is the rate of change of the natural logarithm of the partial pressure of $O_2$ with respect to the reciprocal of the absolute temperature in degrees Kelvin.

5. A method of annealing ferrites selected from the group consisting of single and polycrystalline ferrites containing at least two cation species to provide the same with improved magnetic characteristics which comprises heating the ferrite to a desired annealing temperature in an atmosphere having an oxygen content appropriate to provide a ferrite having the desired magnetic characteristics, soaking the ferrite at the annealing temperature in said atmosphere for a time sufficient for the ferrite to attain equilibrium with the atmosphere, and subsequently cooling the ferrite to room temperature in an atmosphere wherein the partial pressure of the oxygen is decreased as the temperature falls and is matched to the tendency to oxidation of the constituent cations so as to hold the oxidation of the ferrite in a state of substantial equilibrium, said decrease lying between $-3 \times 10^4$ and $-8.5 \times 10^4$ which is the rate of change of the natural logarithm of the partial pressure of $O_2$ with respect to the reciprocal of the absolute temperature in degrees Kelvin.

6. The method set forth in claim 5 wherein the ferrite is heated in an atmosphere wherein the partial pressure of the oxygen is increased as the temperature rises and is matched to the tendency to oxidation of the constituent cations so as to hold the oxidation of the ferrite in a state of substantial equilibrium, said increase lying between $3 \times 10^4$ and $8.5 \times 10^4$ which is the rate of change of the natural logarithm of the partial pressure of $O_2$ with respect to the reciprocal of the absolute temperature in degrees Kelvin appropriate to attain the desired atmosphere at the peak annealing temperature.

7. A method of making ferrites having desired magnetic characteristics which comprises sintering raw metal oxide materials containing at least two cation species at a sintering temperature and in an atmosphere having an oxygen content appropriate to provide ferrites having the desired magnetic characteristics, and subsequently cooling the ferrites thus formed initially in an atmosphere wherein the rate of change of the partial pressure of oxygen follows a line in the upper portion of FIGURE 5 of the drawing and subsequently continuing cooling after abruptly reducing the oxygen content of the atmosphere, along a line below said first line corresponding to the lower portion of FIGURE 5, said transition being selected to maintain a single spinel phase.

8. The method of making ferrites having desired magnetic characteristics which comprises sintering a mixture of manganese oxide, zinc oxide and iron oxide of proportions selected from Table II of the specification at sintering temperatures selected from Table II and in atmospheres having oxygen contents at values selected from Table II to provide ferrites having the desired magnetic flux densities selected from the values of Table II at applied magnetic fields of one-half, one, and ten oersteds, respectively, cooling the ferrites thus formed in an atmosphere wherein the partial pressure of the oxygen is decreased as the temperature falls and is matched to the tendency to oxidation of the constituent cations so as to hold the oxidation of the ferrite in a state of substantial equilibrium, said decrease lying between $-3 \times 10^4$ and $-8.5 \times 10^4$ which is the rate of change of the natural logarithm of the partial pressure of $O_2$ with respect to the reciprocal of the absolute temperaure in degrees Kelvin.

9. The method of making ferrites having desired magnetic characteristics which comprises sintering a mixture of manganese oxide, zinc oxide and iron oxide of proportions selected from Table II of the specification at sintering temperatures selected from Table II and in atmospheres having oxygen contents at values selected from Table II to provide ferrites having the desired magnetic flux densities selected from the values of Table II at applied magnetic fields of one-half, one, and ten oersteds, respectively, and cooling the ferrites thus formed to room temperature along appropriate equilibrium atmosphere curves lying within the envelope defined by paths E and G of FIGURE 7 of the drawings.

10. The method of making ferrites having desired magnetic characteristics which comprises sintering a mixture of manganese oxide, zinc oxide and iron oxide of proportions selected from Table II of the specification at sintering temperatures selected from Table II and in atmospheres having oxygen contents at values selected from Table II to provide ferrites having the desired magnetic flux densities selected from the values of Table II at applied magnetic fields of one-half, one, and ten oersteds, respectively, and cooling the ferrites to a temperature of approximately 1000° C. along the curve defined by path B in FIGURE 7 of the drawings, and at approximately 1000° C. changing the oxygen content of the atmosphere in which the ferrites are being cooled to thereafter cool the ferrites to room temperature along the curve defined by path G in FIGURE 7.

11. The method of making ferrites having desired magnetic characteristics which comprises sintering a mixture of manganese oxide, zinc oxide and iron oxide of proportions selected from Table II of the specification at sintering temperatures selected from Table II and in atmospheres having oxygen contents at values selected from Table II to provide ferrites having the desired magnetic flux densities selected from the values of Table II at applied magnetic fields of one-half, one, and ten oersteds, respectively, and cooling the ferrites to a temperature of approximately 1000° C. along curves lying within the envelope defined by paths B and G of FIGURE 7 of the drawings and at approximately 1000° C. changing the oxygen content of the atmosphere in which the ferrites are being cooled to thereafter cool the ferrites to room temperature along appropriate equilibrium atmosphere curves lying within the envelope defined by paths E and G of FIGURE 7.

12. The method of making ferrites having desired magnetic characteristics which comprises sintering a mixture of nickel oxide, zinc oxide and iron oxide of proportions selected from Table III of the specification at sintering temperatures selected from Table III and in atmospheres having oxygen contents at values selected from Table III to provide ferrites having the desired magnetic flux densities selected from the values of Table III at applied magnetic fields of one oersted at frequencies up to 1000 kilocycles, cooling the ferrites thus formed in an atmosphere wherein the partial pressure of the oxygen is decreased as the temperature falls and is matched to the tendency to oxidation of the constitutent cations so as to hold the oxidation of the ferrite in a state of substantial equilibrium, said decrease lying between $-3 \times 10^4$ and $-8.5 \times 10^4$ which is the rate of change of the natural logarithm of the partial pressure of $O_2$ with respect to the reciprocal of the absolute temperature in degrees Kelvin.

13. The method of making ferrites having desired magnetic characteristics which comprises sintering a mixture of magnesium oxide, manganese oxide and iron oxide of proportions selected from Table IV of the specification at sintering temperatures selected from Table IV and in atmospheres having oxygen contents at values selected from Table IV to provide ferrites having the desired applied field (H) for maximum squareness, the squareness ratio, and the magnetic flux density (B) selected from the values of Table IV, cooling the ferrites thus formed in an atmosphere wherein the partial pressure of the oxygen is decreased as the temperature falls and is matched to the tendency to oxidation of the constituent cations so as to hold the oxidation of the ferrite in a state of substantial equilibrium, said decrease lying between $-3 \times 10^4$ and $-8.5 \times 10^4$ which is the rate of change of the natural logarithm of the partial pressure of $O_2$ with respect to the reciprocal of the absolute temperature in degrees Kelvin.

References Cited in the file of this patent

UNITED STATES PATENTS

| | | |
|---|---|---|
| 2,551,711 | Snoek et al. | May 8, 1951 |
| 2,565,861 | Leverenz et al. | Aug. 28, 1951 |
| 2,579,978 | Snoek et al. | Dec. 25, 1951 |
| 2,584,324 | Bousky | Feb. 5, 1952 |
| 2,640,813 | Berge | June 2, 1953 |
| 2,677,663 | Jonker et al. | May 4, 1954 |
| 2,734,034 | Crowley | Feb. 7, 1956 |
| 2,754,172 | Went et al. | July 10, 1956 |
| 2,770,523 | Toole | Nov. 13, 1956 |

(Other references on following page)

FOREIGN PATENTS

| | | |
|---|---|---|
| 735,375 | Great Britain | Aug. 17, 1955 |
| 737,284 | Great Britain | Sept. 21, 1955 |
| 752,659 | Great Britain | July 11, 1956 |
| 1,086,818 | France | Feb. 16, 1955 |
| 1,107,654 | France | Aug. 10, 1955 |
| 1,122,258 | France | May 22, 1956 |

OTHER REFERENCES

Gorter: Proceedings of the IRE, December 1955, pp. 1953, 1960.

Kordes: Chemical Abstracts, vol. 46, col. 4411—May 25, 1952.

Proceedings of the IRE, October 1956, pp. 1235, 1294, 1304–1309.

Harvey et al.: RCA Review, September 1950, p. 346.